(12) United States Patent
Kim et al.

(10) Patent No.: US 11,354,057 B2
(45) Date of Patent: Jun. 7, 2022

(54) STORAGE DEVICES, DATA STORAGE SYSTEMS AND METHODS OF OPERATING STORAGE DEVICES

(71) Applicant: Samsung Electronics Co., Ltd., Suwon-si (KR)

(72) Inventors: Byoung-Geun Kim, Seoul (KR); Jae-Yoon Choi, Seoul (KR); Joo-Young Hwang, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 175 days.

(21) Appl. No.: 16/276,706

(22) Filed: Feb. 15, 2019

(65) Prior Publication Data

US 2020/0081647 A1 Mar. 12, 2020

(30) Foreign Application Priority Data

Sep. 7, 2018 (KR) .................. 10-2018-0106913

(51) Int. Cl.
  *G06F 3/06* (2006.01)
  *G06F 12/10* (2016.01)
  *G06F 13/16* (2006.01)

(52) U.S. Cl.
  CPC .......... *G06F 3/0647* (2013.01); *G06F 3/0611* (2013.01); *G06F 3/0679* (2013.01);
  (Continued)

(58) Field of Classification Search
  CPC .... G06F 3/0647; G06F 3/0611; G06F 3/0679; G06F 12/10; G06F 13/1668;
  (Continued)

(56) References Cited

U.S. PATENT DOCUMENTS 6,854,084 B2 * 2/2005 Melanson ........... G06F 11/1064
  714/773
7,120,729 B2 10/2006 Gonzalez et al.
(Continued)

FOREIGN PATENT DOCUMENTS

KR 20170121184 11/2018

OTHER PUBLICATIONS

Huang, et al. "FlashBlox: Achieving Both Performance Isolation and Uniform Lifetime for Virtualized SSDs,"The Advanced Computing Systems Association, pp. 374-390 (2017).

*Primary Examiner* — David Yi
*Assistant Examiner* — Alan Otto
(74) *Attorney, Agent, or Firm* — Harness, Dickey & Pierce, P.L.C.

(57) ABSTRACT

A storage device includes a main storage including a plurality of nonvolatile memory devices, the main storage device configured to store data; and a storage controller configured to control the main storage. The storage controller is configured to, divide a plurality of memory blocks of the plurality of nonvolatile memory devices into a plurality of banks, assign each one of the plurality of banks into one of a) a plurality of sets and b) one free bank, each of the plurality of sets including at least one bank, perform data migration operation to transfer the data among the sets by using the one free bank in response to an input/output (I/O) request from an external host device while securing a specific I/O execution time, and control the data migration operation such that the I/O request is independent of the data migration operation.

18 Claims, 25 Drawing Sheets

(52) U.S. Cl.
CPC .......... *G06F 12/10* (2013.01); *G06F 13/1668* (2013.01); *G06F 2212/1044* (2013.01); *G06F 2212/657* (2013.01)

(58) Field of Classification Search
CPC ....... G06F 2212/657; G06F 2212/1044; G06F 3/0658; G06F 3/061; G06F 3/0688; G06F 3/0644; G06F 3/0659; G06F 12/0246; G06F 2212/721
See application file for complete search history.

(56) References Cited

U.S. PATENT DOCUMENTS

| | | | |
|---|---|---|---|
| 8,356,152 B2 | 1/2013 | You | |
| 8,375,160 B2 | 2/2013 | Nakanishi et al. | |
| 9,286,210 B2 | 3/2016 | Tanaka et al. | |
| 9,977,610 B2 | 5/2018 | Kang | |
| 2009/0327591 A1* | 12/2009 | Moshayedi | G06F 11/1441 711/103 |
| 2012/0311291 A1* | 12/2012 | Fiske | G06F 3/0608 711/170 |
| 2016/0335178 A1* | 11/2016 | Patel | G06F 12/0246 |
| 2017/0123700 A1 | 5/2017 | Sinha et al. | |
| 2018/0023632 A1 | 1/2018 | Nishiyama | |
| 2020/0004672 A1* | 1/2020 | Scott | G06F 12/0246 |

* cited by examiner

| SET_ID | LBKN | PBKN | P/E CYCLE |
|--------|------|------|-----------|
| SET1   | 1    | BNK1 | -         |
|        | 2    | BNK2 | -         |
| SET2   | 1    | BNK3 | -         |
|        | 2    | BNK4 | -         |
| SET3   | 1    | BNK5 | -         |
|        | 2    | BNK6 | -         |
| SET4   | 1    | BNK7 | -         |
|        | 2    | BNK8 | -         |

| SET_ID | LBKN | PBKN | P/E CYCLE |
|---|---|---|---|
| SET1 | 1 | BNK1 | 50 |
| | 2 | BNK2 | 50 |
| SET2 | 1 | BNK3 | 2 |
| | 2 | BNK4 | 2 |

| FBNK | BNK9 | 0 |
|---|---|---|

| SET_ID | LBKN | PBKN | P/E CYCLE |
|---|---|---|---|
| SET1 | 1 | BNK9 | 1 |
| | 2 | BNK2 | 50 |
| SET2 | 1 | BNK3 | 2 |
| | 2 | BNK4 | 2 |

| FBNK | BNK1 | 50 |
|---|---|---|

| SET_ID | LBKN | PBKN | P/E CYCLE |
|---|---|---|---|
| SET1 | 1 | BNK9 | 1 |
| | 2 | BNK2 | 50 |
| SET2 | 1 | BNK1 | 51 |
| | 2 | BNK4 | 2 |

| FBNK | | BNK3 | 50 |
|---|---|---|---|

| SET_ID | LBKN | PBKN | P/E CYCLE |
|---|---|---|---|
| SET1 | 1 | BNK9 | 1 |
|  | 2 | BNK3 | 3 |
| SET2 | 1 | BNK1 | 51 |
|  | 2 | BNK2 | 51 |

| FBNK | BNK4 | 2 |
|---|---|---|

STORAGE DEVICES, DATA STORAGE SYSTEMS AND METHODS OF OPERATING STORAGE DEVICES

CROSS-REFERENCE TO RELATED APPLICATION

This U.S. application claims priority under 35 USC § 119 to Korean Patent Application No. 10-2018-0106913, filed on Sep. 7, 2018, in the Korean Intellectual Property Office (KIPO), the disclosure of which is incorporated by reference in its entirety herein.

BACKGROUND

Example embodiments relate generally to data processing, and more particularly to a storage device, a storage system including the same, and/or methods of operating a storage device.

A solid state drive (SSD) is a typical example of a data storage device based on a flash memory device. Examples of an interface being used in a data storage device such as a SSD include a serial AT attachment (SATA), a peripheral component interconnect express (PCIe), a serial attached small computer system interface (SCSI) (SAS), etc. Performance of an SSD is gradually being improved while the quantity of data being processed gradually increases.

However, since a conventional interface such as a SATA may not be an interface specialized for a data storage device such as a SSD in comparison to other interfaces, performance of SATA may be limited. As a result, providers have generated the nonvolatile memory express (NVMe) specification as part of an effort to make a standardized interface suitable for a SSD. The NVMe is an interface of a register level that performs a communication between a data storage device such as SSD and host software. The NVMe is based on a conventional PCIe bus and is an interface designed or, alternatively, optimized for a SSD.

SUMMARY

Some example embodiments provide a storage device capable of internal operation while providing, e.g. supporting and/or guaranteeing, a deterministic input/output (I/O) execution time with respect to a host device.

Some example embodiments provide a storage system capable of internal operation while providing, e.g. supporting and/or guaranteeing, a deterministic I/O execution time with respect to a host device.

Some example embodiments provide a method of operating a storage device, capable of internal operation while guaranteeing a deterministic I/O execution time with respect to a host device.

According to some example embodiments, a storage device includes a main storage including a plurality of nonvolatile memory devices, the main storage device configured to store data; and a storage controller configured to control the main storage. The storage controller is configured to, divide a plurality of memory blocks of the plurality of nonvolatile memory devices into a plurality of banks, assign each one of the plurality of banks into one of a) a plurality of sets and b) one free bank, each of the plurality of sets including at least one bank, perform data migration operation to transfer the data among the sets by using the one free bank in response to an input/output (I/O) request from an external host device while securing a specific I/O execution time, and control the data migration operation such that the I/O request is independent of the data migration operation.

According to some example embodiments, a storage system includes a storage device including a main storage configured to store data and a storage controller configured to control the main storage, the main storage including a plurality of nonvolatile memory devices; and a host device configured to control the storage device by units of a set. The storage controller is configured to, divide a plurality of memory blocks of the plurality of nonvolatile memory devices into a plurality of banks, assign each of the plurality of banks into one of a) a plurality of sets and b) one free bank, each of the plurality of sets including at least one bank, perform data migration operation to transfer the data among the sets by using the one free bank in response to an input/output (I/O) request from an external host device while securing an I/O execution time, and control the data migration operation such that the I/O request is independent of the data migration operation.

According to some example embodiments, in a method of operating a storage device including a main storage that stores data and a storage controller that controls the main storage, a plurality of memory blocks of the main storage are divided into a plurality of sets and one free bank, each of the plurality of sets including at least one bank; and in response to an input/output (I/O) request from an external host device, a data migration operation is performed to transfer the data among the plurality of sets by using the one free bank.

Accordingly, the storage device may perform data migration operation to transfer the data among sets by using the one free bank in response to an I/O request from a host device while providing, e.g. supporting and/or guaranteeing, a specific and/or predetermined I/O execution time with respect to the host, and may control the data migration operation such that the I/O request is unrelated with the data migration operation. Therefore, the storage device may perform wear-leveling as an operation hidden from the host device, while reducing, e.g. minimizing, performance interference among the sets.

BRIEF DESCRIPTION OF THE DRAWINGS

Illustrative, non-limiting example embodiments will be more clearly understood from the following detailed description in conjunction with the accompanying drawings.

FIG. 11 illustrates an example of the mapping table in FIG. 3 when the banks in the nonvolatile storages are assigned to the sets in FIG. 10.

FIG. 12 illustrates an example of a state of the storage system of FIG. 1 before the data migration operation is performed internally by the storage device and FIG. 13 illustrates an example of the mapping table in FIG. 3 in case of FIG. 12.

FIG. 15 illustrates an example of the mapping table in FIG. 3 in case of FIG. 14.

FIG. 17 illustrates an example of the mapping table in FIG. 3 in case of FIG. 16.

FIG. 19 illustrates an example of the mapping table in FIG. 3 in case of FIG. 18.

DETAILED DESCRIPTION OF EXAMPLE EMBODIMENTS

Various example embodiments will be described more fully hereinafter with reference to the accompanying drawings, in which some example embodiments are shown.

As illustrated below, each of the component blocks may be implemented in hardware, e.g. in hardware configured to execute non-transient instructions. For example, unless otherwise specified, components such as controllers such as storage controllers, engines such as error detection and correction engines, managers such as migration mangers, etc. may be implemented as a circuit, an FPGA, and/or a processor that is configured to execute machine readable instructions such that, when executed by the processor, cause the processor to perform the specific functions.

Figure 1:
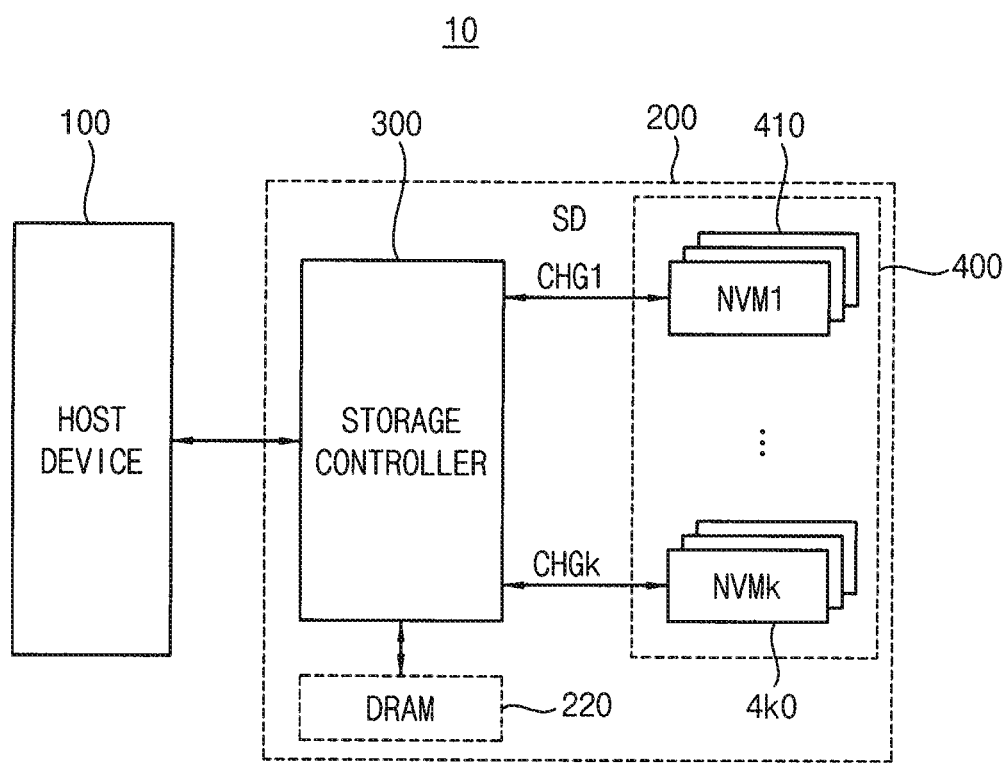
FIG. 1 is a block diagram illustrating a data storage system (or, a storage system) according to some example embodiments.

FIG. 1 is a block diagram illustrating a storage system (or, a data storage system) according to some example embodiments.

Referring to FIG. 1, a storage system 10 includes a host device 100 and a solid state drive (SSD, or, a storage device) 200.

The host device 100 may control overall operation of the SSD 200. The host device 100 may exchange signals with SSD 200. The signals exchanged between the host device 100 and the SSD 200 may include at least one of a command, an address, data, etc.

The SSD 200 may include a storage controller 300 and a main storage 400, and the main storage 400 may include a plurality of nonvolatile storages 410~4k0. Each of the nonvolatile storages 410~4k0 may include NAND flash memories. Here, k is an natural number greater than two.

The storage controller 300 may exchange the signals such as a command, an address, data, etc. with the host device 100. The storage controller 300 may write data in a corresponding nonvolatile storage and may read data from a corresponding nonvolatile storage according to the command.

The SSD 200 may further include a dynamic random access memory (DRAM) 220 connected to the storage controller 300.

The DRAM 220 may be used as a buffer area temporarily storing data received from the host device 100 and/or temporarily storing data read from the nonvolatile storages 410~4k0. The DRAM 220 may also be used to drive software used for management, e.g. an effective management of the nonvolatile storages 410~4k0. The DRAM 220 may be used to store meta data received from the host device 100 and/or may be used to store cache data. In some embodiments, the SSD 200 may be embodied by augmenting or replacing the DRAM with volatile memories such as SRAM, etc.

The plurality of nonvolatile storages 410~4k0 may be used as a storage medium of the SSD 200. The nonvolatile storages 410~4k0 may be connected to the storage controller 300 through a plurality of channel groups CHG1~CHGk. Each of the channel groups CHG1~CHGk may include at least one channel. One or more nonvolatile storages may be connected to one channel group. A nonvolatile storage connected to one channel group may be connected to the same data bus.

Although not illustrated, the SSD 200 may further include a pad to be connected to the host device 100. The SSD 200 can be attached and/or detached, e.g. easily attached to and/or detached from, the host device 100 through the pad. The pad may be formed inside the SSD 200 or may be formed in the form of connector outside the SSD 200. In some example embodiments, the SSD 200 may not include the pad and may be connected to the host device 100 through a routing process.

Figure 2:
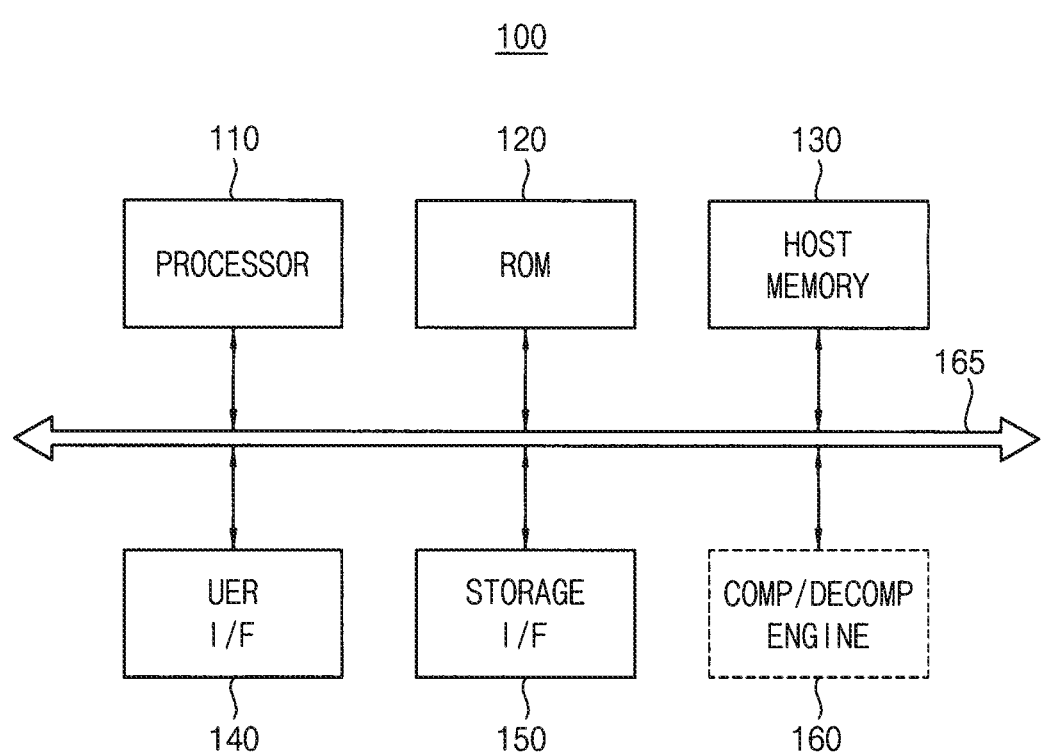
FIG. 2 is a block diagram illustrating the host device in FIG. 1 according to some example embodiments.

FIG. 2 is a block diagram illustrating the host device in FIG. 1 according to some example embodiments.

Referring to FIG. 2, the host device 100 may include a processor 110, a read-only memory (ROM) 120, a host memory 130, a user interface 140, a storage interface 150, and/or a bus 165. The host device 100 may further include a compression/decompression engine 160.

The bus 165 may refer to a transmission channel via which data is transmitted between the processor 110, the ROM 120, the host memory 130, the user interface 140, the storage interface 150, and/or the compression/decompression engine 160 of the host device 100.

The ROM 120 may store various application programs, for example, application programs supporting storage protocols such as Advanced Technology Attachment (ATA), Small Computer System Interface (SCSI), embedded Multi Media Card (eMMC), and Universal Flash storage (UFS) protocols and NVMe.

The host memory 130 may temporarily store data or programs.

The storage interface 150 may include interfaces supporting storage protocols such as SATA, SAS, eMMC, UFS, and/or NVMe.

The user interface 140 may be or include a physical or virtual medium for exchanging information between a user and the host device 100, a computer program, etc., and may include physical hardware and logical software. For example, the user interface 140 may include an input device for allowing the user to manipulate the host device 100, and/or an output device for outputting a result of processing an input of the user.

The processor 110 may control overall operations of the host device 100. The processor 110 may generate a request and/or a command for storing data in the SSD 200 or a request and/or or a command for reading data from the SSD 200 by using an application stored in the ROM 120, and transmit the request to the SSD 200 via the storage interface 150.

Figure 3:
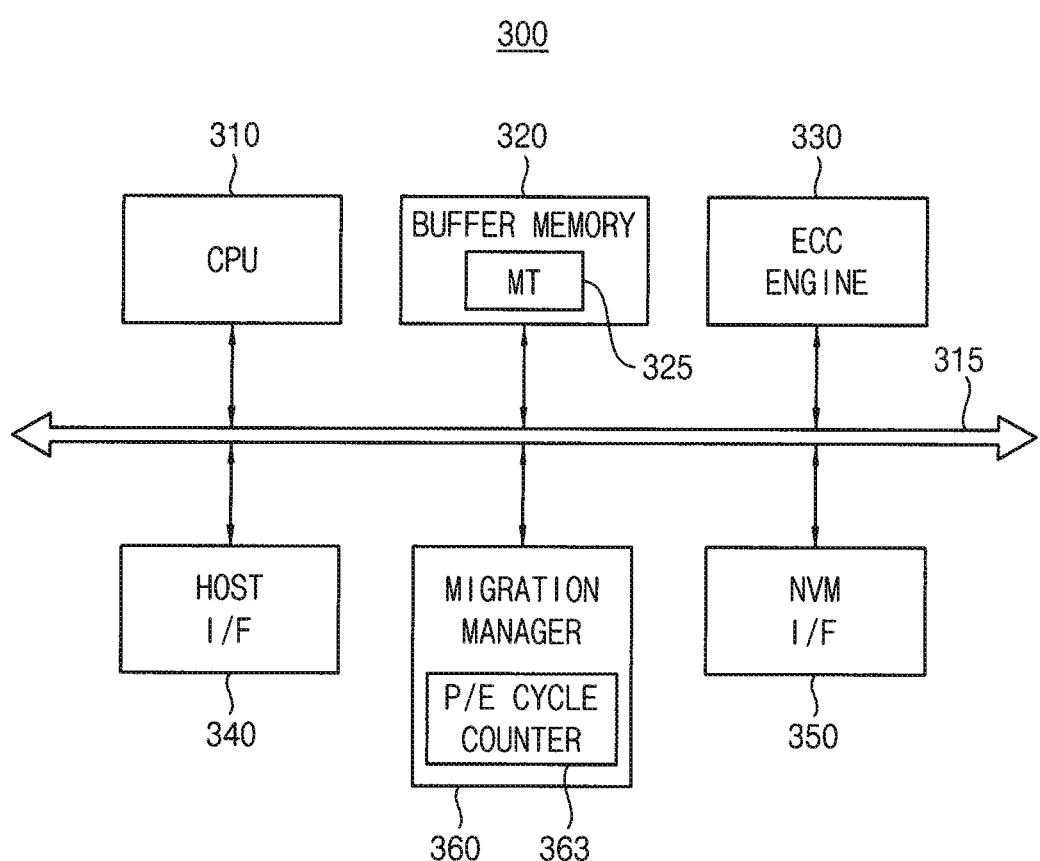
FIG. 3 is a block diagram illustrating the storage controller in FIG. 1 according to some example embodiments.

FIG. 3 is a block diagram illustrating the storage controller in FIG. 1 according to some example embodiments.

Referring to FIG. 3, the storage controller 300 may include a processor 310 such as a CPU, a buffer memory 320, an error correction code (ECC) engine 330, a host interface 340, a migration manager 360, a nonvolatile memory interface 350, and/or a bus 315.

The bus 315 may refer to a transmission channel via which data is transmitted between the processor 310, the buffer memory 320, the ECC engine 330, the host interface 340, the migration manager 360, and the nonvolatile memory interface 350 of the storage controller 300. The processor 310 may perform operation for data exchange between the host device 100 and the nonvolatile storages 410~4k0.

The host interface 340 is connected to the host device 100 and the nonvolatile memory interface 350 is connected to the nonvolatile storages 410~4k0. The processor 310 may communicate with the host device 100 via the host interface 340. The host interface 340 may be implemented using, but not limited to, a SATA interface, a Parallel Advanced Technology Attachment (PATA) interface, USB or SAS interface, an eMMC interface, a UFS interface, and/or an eMMC interface.

The processor 310 may communicate with the nonvolatile storages 410~4k0 through nonvolatile memory interface 350. The nonvolatile memory interface 350 may be connected to each of the nonvolatile storages 410~4k0.

The ECC engine 330 may generate an error correction code (ECC) for data which is received from the host device 100 using various engines during a write operation. During a read operation, the ECC block engine may perform error detection and error correction on data read from the nonvolatile storages 410~4k0 to provide the data to the host device 100.

The buffer memory 320 may temporarily store one or more of the original data, the compressed data, and the read compressed data. In addition, the buffer memory 320 may include a mapping table 325 that stores mapping information to map logical bank addresses to physical bank addresses of banks into which a plurality of memory blocks of the nonvolatile storages 410~4k0. Still further, the mapping table 325 may store set identities of sets to discriminate physical banks.

The host device 100 may access the nonvolatile storages 410~4k0 by unit of a set.

When the storage device 200 receives an input/output (I/O) request from the host device 100, the migration manage 360 and/or the storage controller 300 provides, e.g. secures and/or guarantees, a deterministic I/O execution time with respect to the host device 100, performs data migration operation to transfer the data among the sets by using the one free bank, and controls the data migration operation such that the I/O request is independent of, e.g. unrelated with, the data migration operation. For example, the migration manager 360 controls the data migration operation such that the I/O request is not affected, e.g. unaffected, by the data migration operation. The migration manager 360 may include a program/erase cycle counter 363 that counts program/erase cycles of each of the banks and/or each of the sets.

Providing, e.g. securing and/or guaranteeing, the deterministic I/O execution time with respect to the host device 100 means that the execution time of I/O operation between the host device 100 and the storage device 200 is not affected by the data migration operation, is not changed by the data migration operation, and/or is not delayed by the data migration operation. For example, the I/O operation between the host device 100 and the storage device 200 is performed according to time interval defined in the specification, e.g. the NVMe specification, although the data migration operation is performed internally in the storage device 200.

The program/erase cycle counter 363 may count program/erase cycles of each of the banks, associated with a request from the host device 100 and may count program/erase cycles of each of the banks, associated with the data migration operation. The program/erase cycle counter 363 may store counted program/erase cycles of each of the banks in the mapping table 325.

Figure 4:
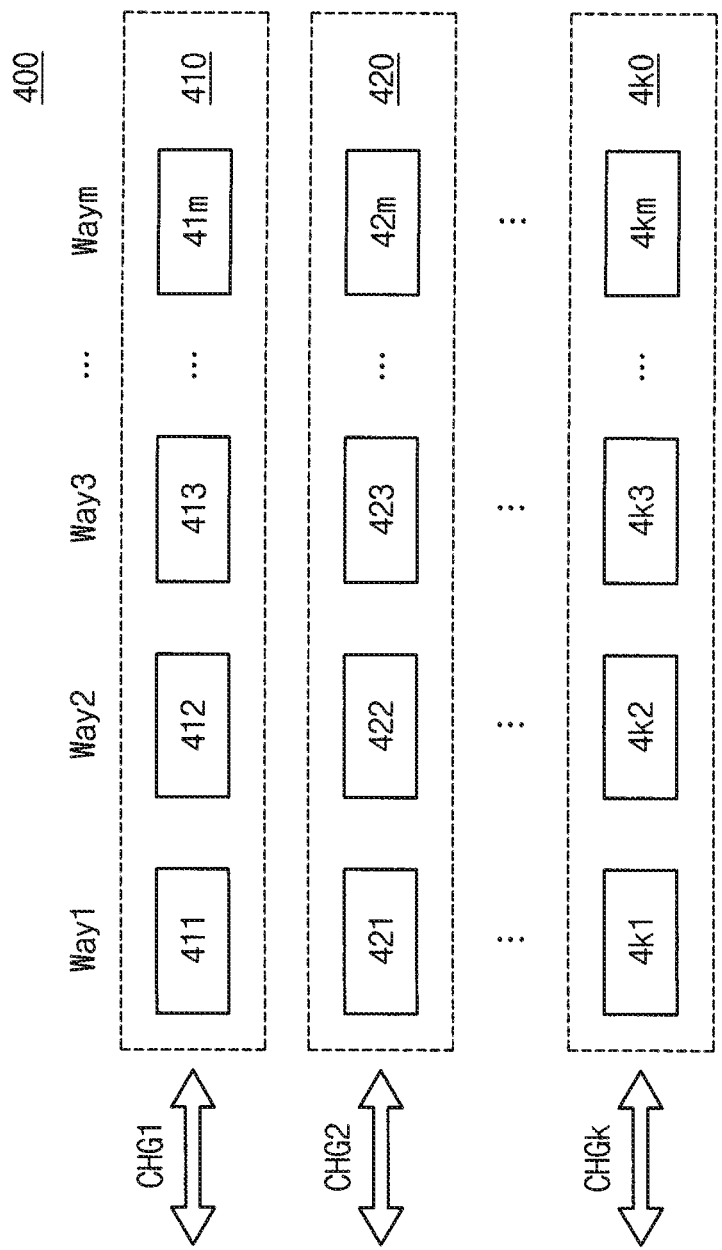
FIG. 4 illustrates an example of a plurality of channels and ways of the main storage in FIG. 1 according to some example embodiments.

FIG. 4 illustrates an example of a plurality of channels and ways of the main storage in FIG. 1 according to some example embodiments.

Referring to FIG. 4, the nonvolatile storages 410~4k0 are coupled to corresponding one of the plurality of channel groups CHG1~CHGk. A plurality of nonvolatile memory devices 411~41m, 421~42m, . . . , 4k1~4km coupled to corresponding one of the plurality of channel groups CHG1~CHGk may form a plurality of ways way1~waym. Here, m is a natural number greater than two. That is, respective m nonvolatile memory devices 411~41m, 421~42m, . . . , 4k1~4km may be included in m ways in each of the channel groups CHG1~CHGk.

A way indicates a unit for dividing nonvolatile memory devices sharing an identical channel. Each of the nonvolatile memory devices may be identified according to channel numbers and way numbers.

Figure 5:
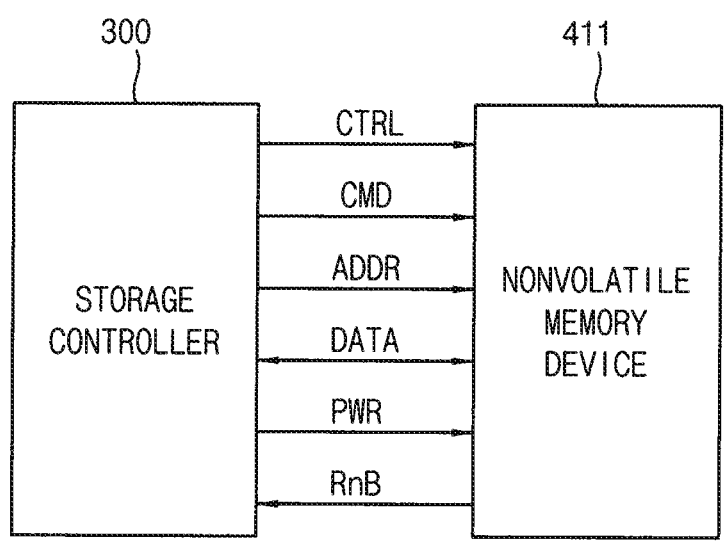
FIG. 5 is a block diagram illustrating a relationship between the storage controller and one nonvolatile memory device in the storage device of FIG. 1.

FIG. 5 is a block diagram illustrating a relationship between the storage controller and one nonvolatile memory device in the storage device of FIG. 1.

Referring to FIG. 5, the nonvolatile memory device 411 may perform an erase operation, a program operation, and/or a write operation under control of the storage controller 300. The nonvolatile memory device 411 may receive a command CMD, an address ADDR, and data DATA through input/output lines from the storage controller 300 for performing such operations.

In addition, the nonvolatile memory device 411 may receive a control signal CTRL through a control line and receives a power PWR through a power line from the storage controller 300. In addition, the nonvolatile memory device 411 may provide a status signal RnB to the storage controller 300 through the control line.

Figure 6:
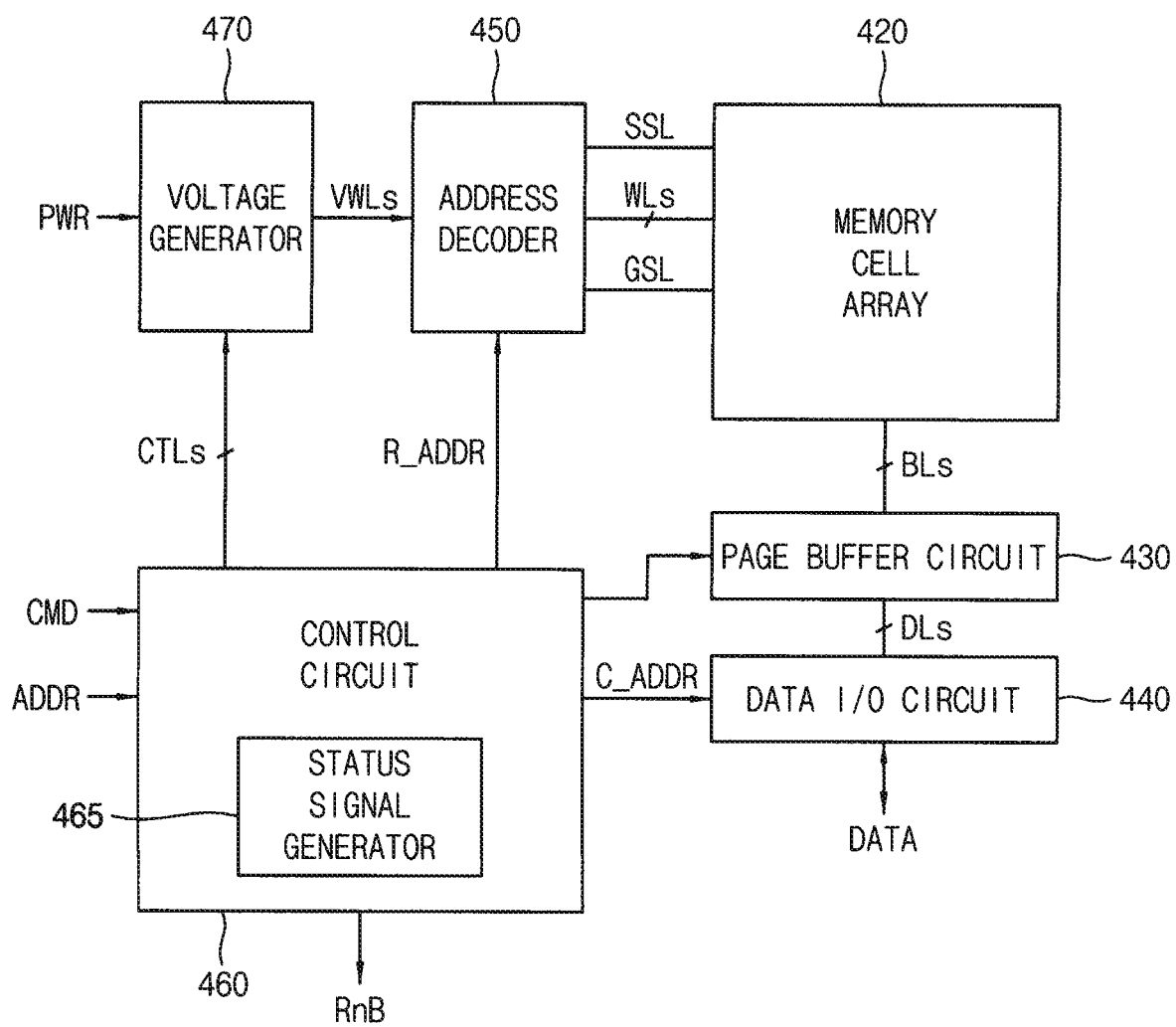
FIG. 6 is a block diagram illustrating the nonvolatile memory device in FIG. 5 according to some example embodiments.

FIG. 6 is a block diagram illustrating the nonvolatile memory device in FIG. 5 according to some example embodiments.

Referring to FIG. 6, the nonvolatile memory device 411 includes a memory cell array 420, an address decoder 450, a page buffer circuit 430, a data input/output circuit 440, a control circuit 460, and a voltage generator 470.

The memory cell array 420 may be coupled to the address decoder 450 through a string selection line SSL, a plurality of word-lines WLs, and a ground selection line GSL. In addition, the memory cell array 420 may be coupled to the page buffer circuit 430 through a plurality of bit-lines BLs.

The memory cell array 420 may include a plurality of memory cells coupled to the plurality of word-lines WLs and the plurality of bit-lines BLs.

In some example embodiments, the memory cell array 420 may be or include a three-dimensional memory cell array, which is formed on a substrate in a three-dimensional structure (e.g., a vertical structure). In this case, the memory cell array 420 may include vertical cell strings that are vertically oriented such that at least one memory cell is located over another memory cell.

In some example embodiments, the memory cell array 420 may be or include a two-dimensional memory cell array, which is formed on a substrate in a two-dimensional structure (or a horizontal structure).

Figure 7:
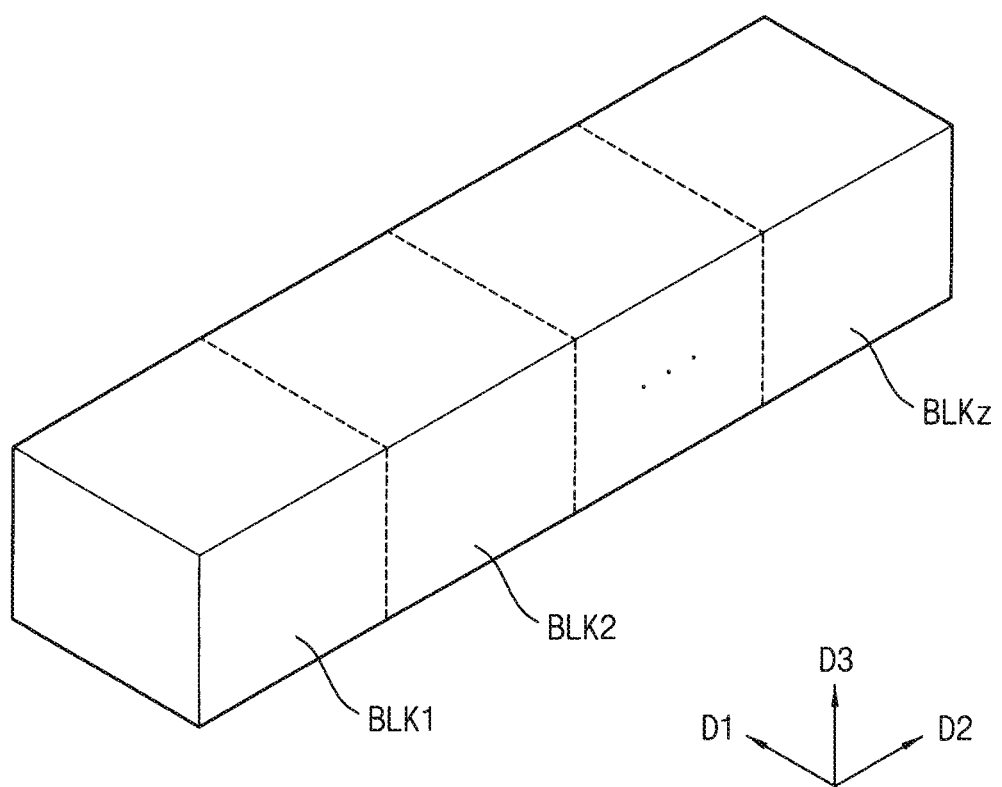
FIG. 7 is a block diagram illustrating the memory cell array in the nonvolatile memory device of FIG. 6.

FIG. 7 is a block diagram illustrating the memory cell array in the nonvolatile memory device of FIG. 6.

Referring to FIG. 7, the memory cell array 420 may include a plurality of memory blocks BLK1 to BLKz. The memory blocks BLK1 to BLKz extend along first through third directions D1, D2 and D3. In some example embodiments, the memory blocks BLK1 to BLKz are selected by the address decoder 450 in FIG. 6. For example, the address decoder 450 may select a memory block BLK corresponding to a block address among the memory blocks BLK1 to BLKz.

Figure 8:
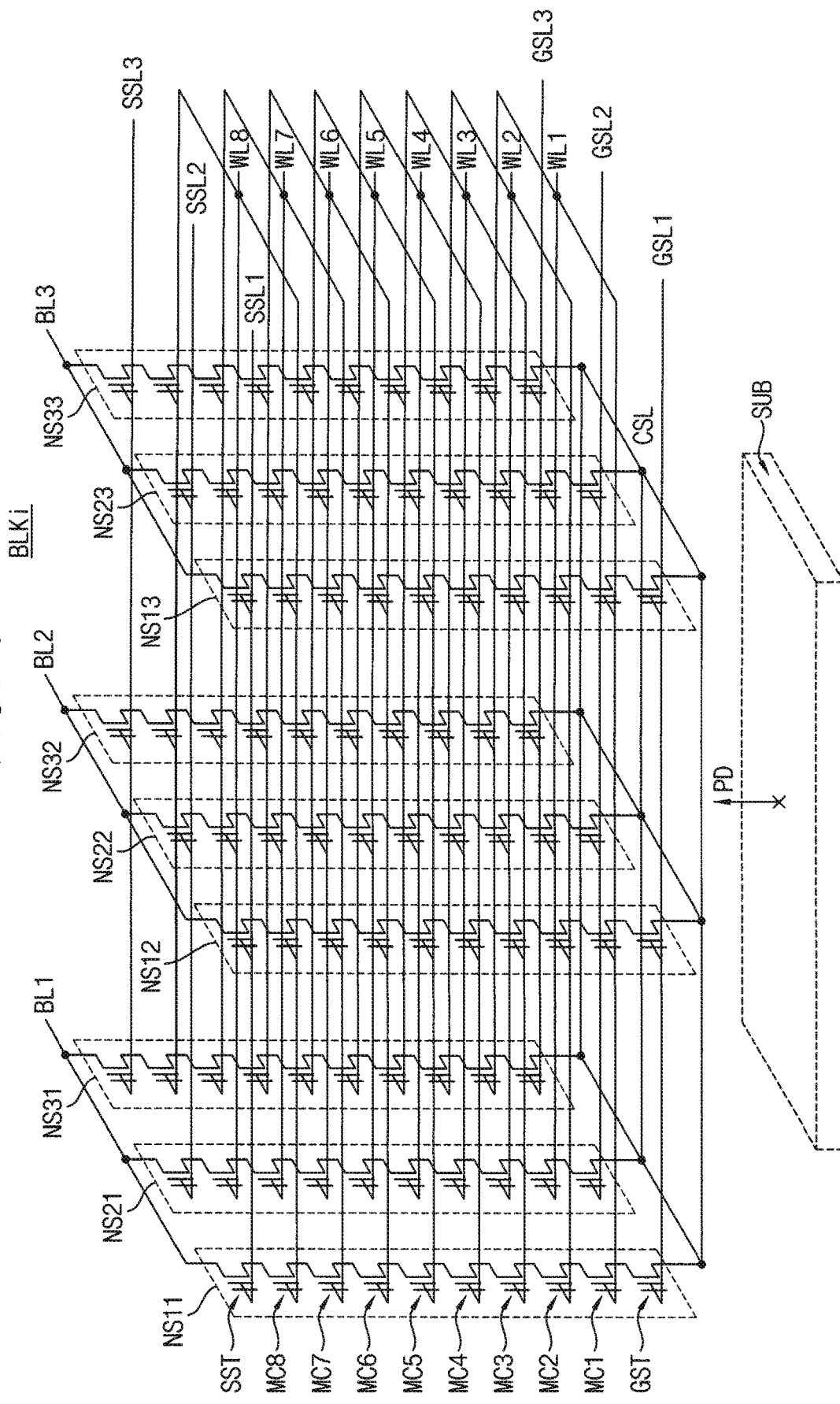
FIG. 8 is a circuit diagram illustrating one of the memory blocks of FIG. 7.

FIG. 8 is a circuit diagram illustrating one of the memory blocks of FIG. 7.

The memory block BLKi of FIG. 8 may be formed on a substrate SUB in a three-dimensional structure (or a vertical structure). For example, a plurality of memory cell strings included in the memory block BLKb may be formed in a direction PD perpendicular to the substrate SUB.

Referring to FIG. 8, the memory block BLKi may include memory cell strings NS11 to NS33 coupled between bit-lines BL1, BL2 and BL3 and a common source line CSL. Each of the memory cell strings NS11 to NS33 may include a string selection transistor SST, a plurality of memory cells MC1 to MC8, and a ground selection transistor GST. In FIG. 8, each of the memory cell strings NS11 to NS33 is illustrated to include eight memory cells MC1 to MC8. However, inventive concepts are not limited thereto. In some example embodiments, each of the memory cell strings NS11 to NS33 may include any number of memory cells.

The string selection transistor SST may be connected to corresponding string selection lines SSL1 to SSL3. The plurality of memory cells MC1 to MC8 may be connected to corresponding word-lines WL1 to WL8, respectively. The ground selection transistor GST may be connected to corresponding ground selection lines GSL1 to GSL3. The string selection transistor SST may be connected to corresponding bit-lines BL1, BL2 and BL3, and the ground selection transistor GST may be connected to the common source line CSL.

Figure 9:
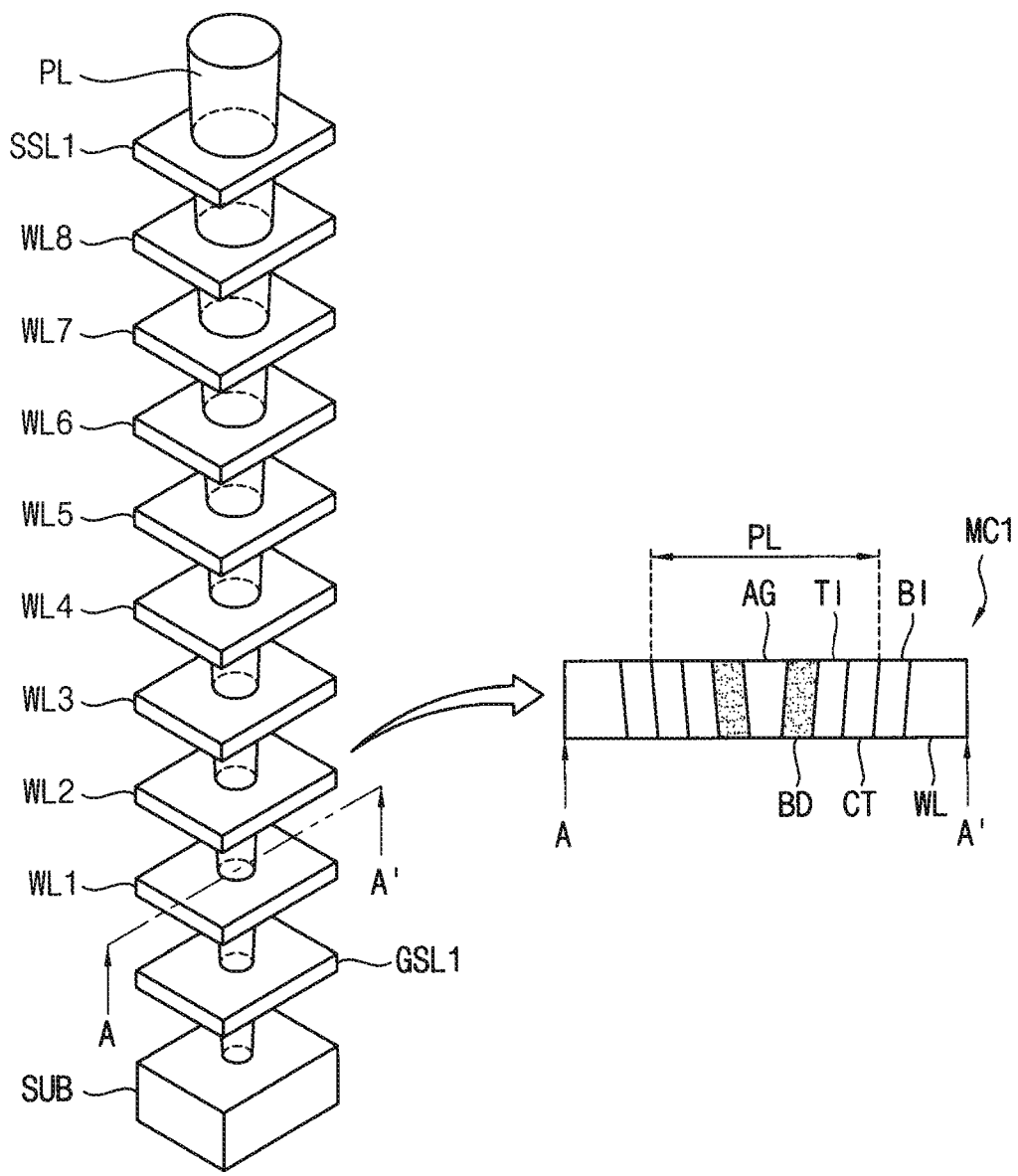
FIG. 9 illustrates an example of a structure of a cell string CS in the memory block of FIG. 8.

Word-lines (e.g., WL1) having the same height may be commonly connected, and the ground selection lines GSL1 to GSL3 and the string selection lines SSL1 to SSL3 may be separated. In FIG. 9, the memory block BLKb is illustrated to be coupled to eight word-lines WL1 to WL8 and three bit-lines BL1 to BL3. However, inventive concepts are not limited thereto. In some example embodiments, the memory cell array 420 may be coupled to any number of word-lines and bit-lines.

FIG. 9 illustrates an example of a structure of a cell string CS in the memory block of FIG. 8.

Referring to FIGS. 8 and 9 a pillar PL is provided on the substrate SUB such that the pillar PL extends in a direction perpendicular to the substrate SUB to make contact with the substrate SUB. Each of the ground selection line GSL, the word lines WL1 to WL8, and the string selection lines SSL illustrated in FIG. 9 may be formed of a conductive material parallel with the substrate SUB, for example, a metallic material. The pillar PL may be in contact with the substrate SUB through the conductive materials forming the string selection lines SSL, the word lines WL1 to WL8, and the ground selection line GSL.

A sectional view taken along a line A-A' is also illustrated in FIG. 9. In some example embodiments, a sectional view of a first memory cell MC1 corresponding to a first word line WL1 is illustrated. The pillar PL may include a cylindrical body BD. An air gap AG may be defined in the interior of the body BD.

The body BD may include P-type silicon and may be an area where a channel will be formed. The pillar PL may further include a cylindrical tunnel insulating layer TI surrounding the body BD and a cylindrical charge trap layer CT surrounding the tunnel insulating layer TI. A blocking insulating layer BI may be provided between the first word line WL and the pillar PL. The body BD, the tunnel insulating layer TI, the charge trap layer CT, the blocking insulating layer BI, and the first word line WL may constitute or be included in a charge trap type transistor that is formed in a direction perpendicular to the substrate SUB or to an upper surface of the substrate SUB. A string selection transistor SST, a ground selection transistor GST, and other memory cells may have the same structure as the first memory cell MC1.

Referring back to FIG. 6, the control circuit 460 may receive the command (signal) CMD and the address (signal) ADDR from the storage controller 300, and may control an erase loop, a program loop and/or a read operation of the nonvolatile memory device 411 based on the command signal CMD and the address signal ADDR. The program loop may include a program operation and a program verification operation. The erase loop may include an erase operation and an erase verification operation.

For example, the control circuit 460 may generate control signals CTLs, which are used for controlling the voltage generator 470, based on the command signal CMD, and generate a row address R_ADDR and a column address C_ADDR based on the address signal ADDR. The control circuit 460 may provide the row address R_ADDR to the address decoder 450 and provide the column address C_ADDR to the data input/output circuit 440.

The address decoder 450 may be coupled to the memory cell array 420 through the string selection line SSL, the plurality of word-lines WLs, and the ground selection line GSL. During the program operation or the read operation, the address decoder 450 may determine one of the plurality of word-lines WLs as a first word-line (e.g., a selected word-line) and determine rest of the plurality of word-lines WLs except for the first word-line as unselected word-lines based on the row address R_ADDR.

The voltage generator 470 may generate word-line voltages VWLs, which are required for the operation of the nonvolatile memory device 411, based on the control signals CTLs. The voltage generator 470 may receive a power PWR from the storage controller 300. The word-line voltages VWLs may be applied to the plurality of word-lines WLs through the address decoder 450.

For example, during the erase operation, the voltage generator 470 may apply an erase voltage to a well of the memory block and may apply a ground voltage to entire word-lines of the memory block. During the erase verification operation, the voltage generator 470 may apply an erase verification voltage to the entire word-lines of the memory block or sequentially apply the erase verification voltage to word-lines in a word-line basis.

For example, during the program operation, the voltage generator 470 may apply a program voltage to the first word-line and may apply a program pass voltage to the unselected word-lines. In addition, during the program verification operation, the voltage generator 470 may apply a program verification voltage to the first word-line and may apply a verification pass voltage to the unselected word-lines.

Furthermore, during the read operation, the voltage generator 470 may apply a read voltage to the first word-line and may apply a read pass voltage to the unselected word-lines.

The page buffer circuit 430 may be coupled to the memory cell array 420 through the plurality of bit-lines BLs. The page buffer circuit 430 may include a plurality of page buffers. In some example embodiments, one page buffer may be connected to one bit-line. In some example embodiments, one page buffer may be connected to two or more bit-lines.

The page buffer circuit 430 may temporarily store data to be programmed in a selected page or data read out from the selected page.

The data input/output circuit 440 may be coupled to the page buffer circuit 430 through data lines DLs. During the program operation, the data input/output circuit 440 may receive the data DATA from the storage controller 300 and provide the data DATA to the page buffer circuit 430 based on the column address C_ADDR received from the control circuit 460. During the read operation, the data input/output circuit 440 may provide the data DATA, which are stored in the page buffer circuit 430, to the storage controller 300 based on the column address C_ADDR received from the control circuit 460.

In addition, the page buffer circuit 430 and the data input/output circuit 440 read data from a first area of the memory cell array 420 and write the read data to a second area of the memory cell array 420. For example, the page buffer circuit 430 and the data input/output circuit 440 may perform a copy-back operation.

The control circuit 460 may include a status signal generator 465 and the status signal generator 465 may generate the status signal RnB indicating whether each of the program operation, the erase operation and the read operation is completed or and/or is in progress.

Figure 10:
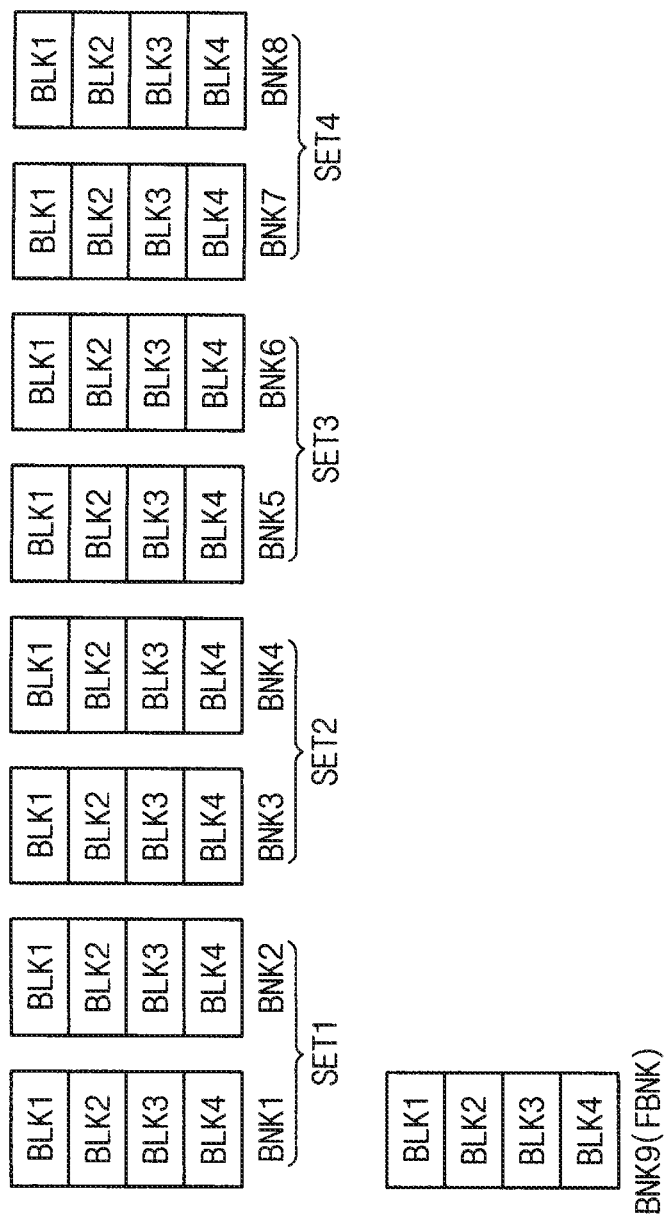
FIG. 10 illustrates an example that the nonvolatile storages included in the storage device in FIG. 1 are assigned to a plurality of sets.

FIG. 10 illustrates an example that the nonvolatile storages included in the storage device in FIG. 1 are assigned to a plurality of sets.

Referring to FIG. 10, the memory blocks included in the nonvolatile storages 410~4k0 may be divided into a plurality of banks BNK1~BNK9.

Each of the plurality of banks BNK1~BNK9 may include memory blocks BLK1~BLK4.

The storage controller 300 may perform only one of the read operation, the program operation and the erase operation on one of the plurality of banks BNK1~BNK9 at a given time. Each of the plurality of banks BNK1~BNK9 may include a memory element that generates delay due to interference of the read operation, the program operation and the erase operation in the same bank.

The host device 100 may access some of the banks BNK1~BNK9 by units of such sets.

The host device 100 may assign the banks BNK1 and BNK2 to a first set SET1, may assign the banks BNK3 and BNK4 to a second set SET2, may assign the banks BNK5 and BNK6 to a third set SET3, may assign the banks BN71 and BNK8 to a fourth set SET4, and may access the banks BNK1~BNK8 by unit of set. The bank BNK9 which is not assigned to a set by the host device 100 may be used as a free bank FBNK in the storage device 200.

A set means a group of banks separated from other set logically and/or physically. A performance/operation of a set is not affected by performance/operation of another set. The host device 100 may store data, which is, e.g. needs to be, separated, in different sets of the sets SET1~SET4, and may access the data stored in the different sets according to applications without interference of performance.

FIG. 11 illustrates an example of the mapping table in FIG. 3 when the banks in the nonvolatile storages are assigned to the sets in FIG. 10.

Referring to FIG. 11, the mapping table 325 may store set identifier SET_ID to identify each of the sets, a logical bank number LBKN of each of the banks, a physical bank number PBNK of each of the banks, and a program/erase cycle P/E CYCLE of each of the banks.

The physical bank number PBNK (e.g., a physical bank address) of the bank BNK1 may be assigned to a first logical bank number LBKN1 (e.g., a logical bank address) of the set SET1, and the physical bank number of the bank BNK1 may be assigned to a second logical bank number LBKN2 of the set SET1. The physical bank number PBNK of the bank BNK3 may be assigned to a first logical bank number LBKN1 of the set SET2, and the physical bank number of the bank BNK4 may be assigned to a second logical bank number LBKN2 of the set SET2. The above-mentioned mapping may be similarly applied to the banks BNK5~BNK8.

Figure 12:
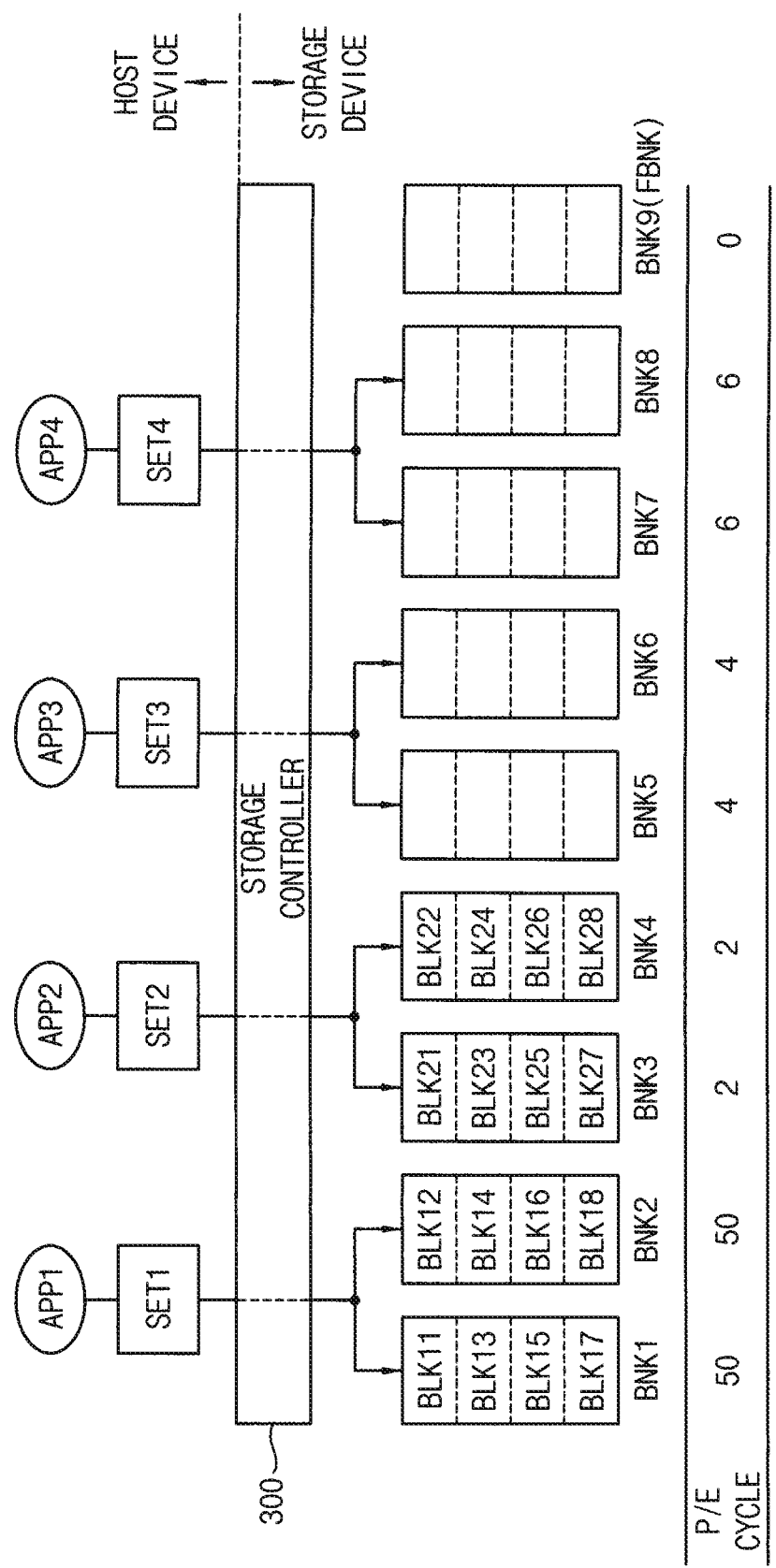

FIG. 12 illustrates an example of a state of the storage system of FIG. 1 before the data migration operation is performed internally by the storage device, and FIG. 13 illustrates an example of the mapping table in FIG. 3 in case of FIG. 12.

Referring to FIG. 12, the host device 100 may assign applications APP1~APP4 to corresponding one of the sets SET1~SET4 according to characteristics of the applications APP1~APP4 running on the host device 100. As mentioned above, the host device 100 assigns the banks BNK1 and BNK2 to the first set SET1, assigns the banks BNK3 and BNK4 to the second set SET2, assigns the banks BNK5 and BNK6 to the third set SET3, and assigns the banks BNK7 and BNK8 to the fourth set SET4.

It is assumed, for illustrative purposes, that the first bank BNK1 includes memory blocks BLK11, BLK13, BLK15 and BLK17, the second bank BNK2 includes memory blocks BLK12, BLK14, BLK16 and BLK18, the third bank BNK3 includes memory blocks BLK21, BLK23, BLK25 and BLK27, and the fourth bank BNK4 includes memory blocks BLK22, BLK24, BLK26 and BLK28.

The application APP1 may be write-intensive, and a first program/erase cycle of the banks BNK1 and BNK2 in the first set SET1 have a value of 50, e.g. 50 program/erase cycles have been performed on BNK1 and BNK2. The application APP2 may be read-intensive, and a second program/erase cycle of the banks BNK3 and BNK4 in the second set SET2 have a value of 2, e.g. 2 program erase/ cycles have been performed on banks BNK3 and BNK4. Since the first program/erase cycle of the first set SET1 is greater than the second program/erase cycle of the second set SET2, a lifespan and/or performance of the main storage 400 may be degraded due to the first set SET1 when the program/erase cycle of the first set SET1 continues to increment.

When there occurs imbalance among the program/erase cycles of the sets, the migration manager 360 in the storage controller 300 may provide, e.g. secure/guarantee, a more deterministic I/O execution time to the host device 100, and may perform data migration operation to transfer the data among the sets by using the free bank FBNK internally in the storage device 200.

Figure 14:
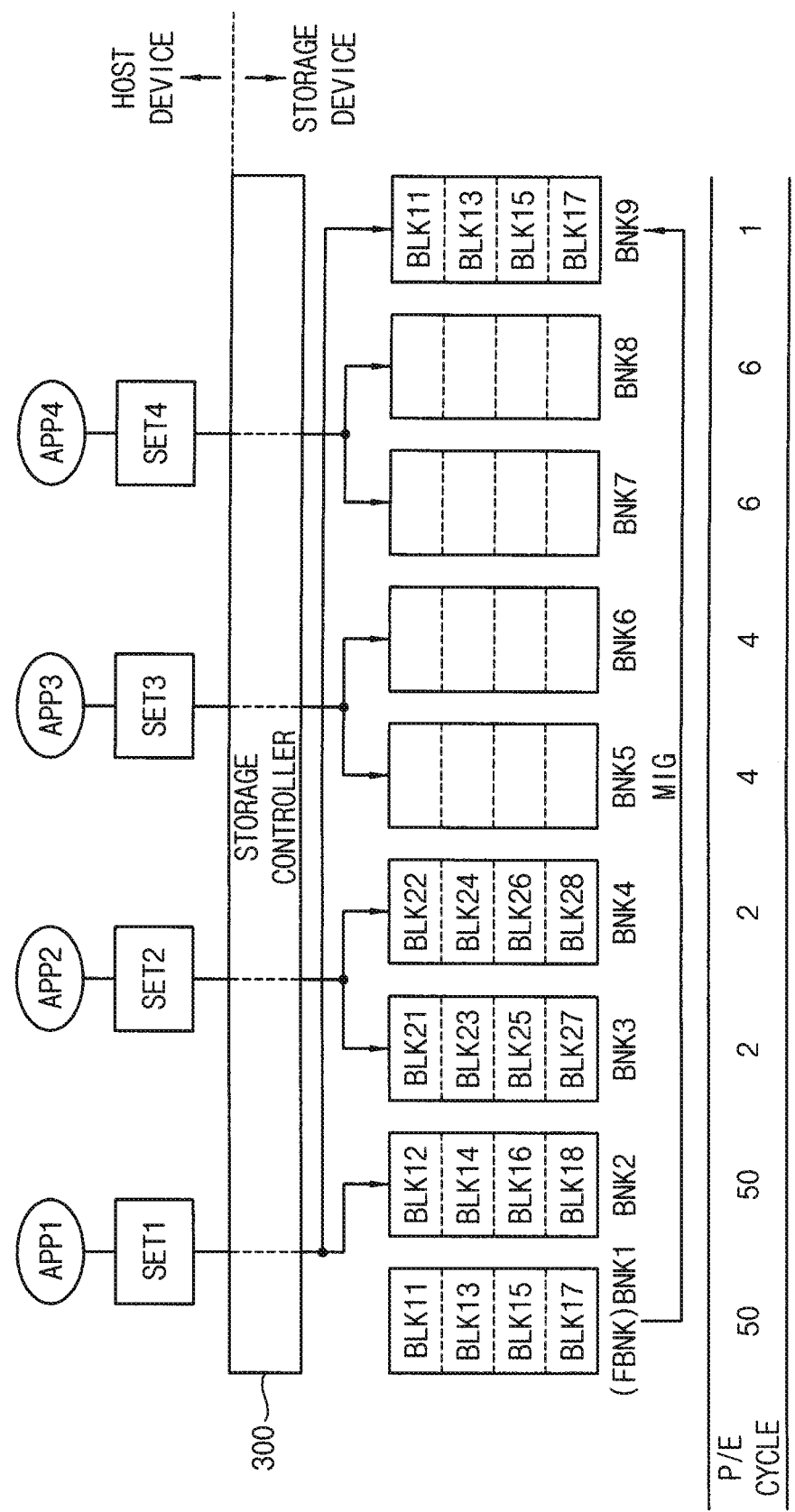
FIG. 14 illustrates an example that the data migration operation is performed from the first bank to the free bank in the storage system of FIG. 12

FIG. 14 illustrates an example that the data migration operation is performed from the first bank to the free bank in the storage system of FIG. 12 and FIG. 15 illustrates an example of the mapping table in FIG. 3 in case of FIG. 14.

Referring to FIGS. 14 and 15, the migration manager 360 migrates MIG a first data stored in the first bank BNK1 to the ninth bank BNK9, which is the free bank FBNK, maps a physical bank address of the ninth bank BNK9 to the logical bank address LBK1 of the first set SET1 when the migration of the first data is completed, performs erase operations on the memory blocks BLK11, BLK13, BLK15 and BLK17 of the first bank BNK1, and updates the mapping table 325 by recording the first bank BNK1 as the free bank FBNK in the mapping table 325 as illustrated in FIG. 15.

In case of FIGS. 14 and 15, a program/erase cycle of the ninth bank BNK9 mapped to the first logical bank address LBK1 of the first set SET1 may have a value of 1. In addition, since the program/erase operation is performed only in the free bank FBNK, there is no interference of performance among the sets.

Figure 16:
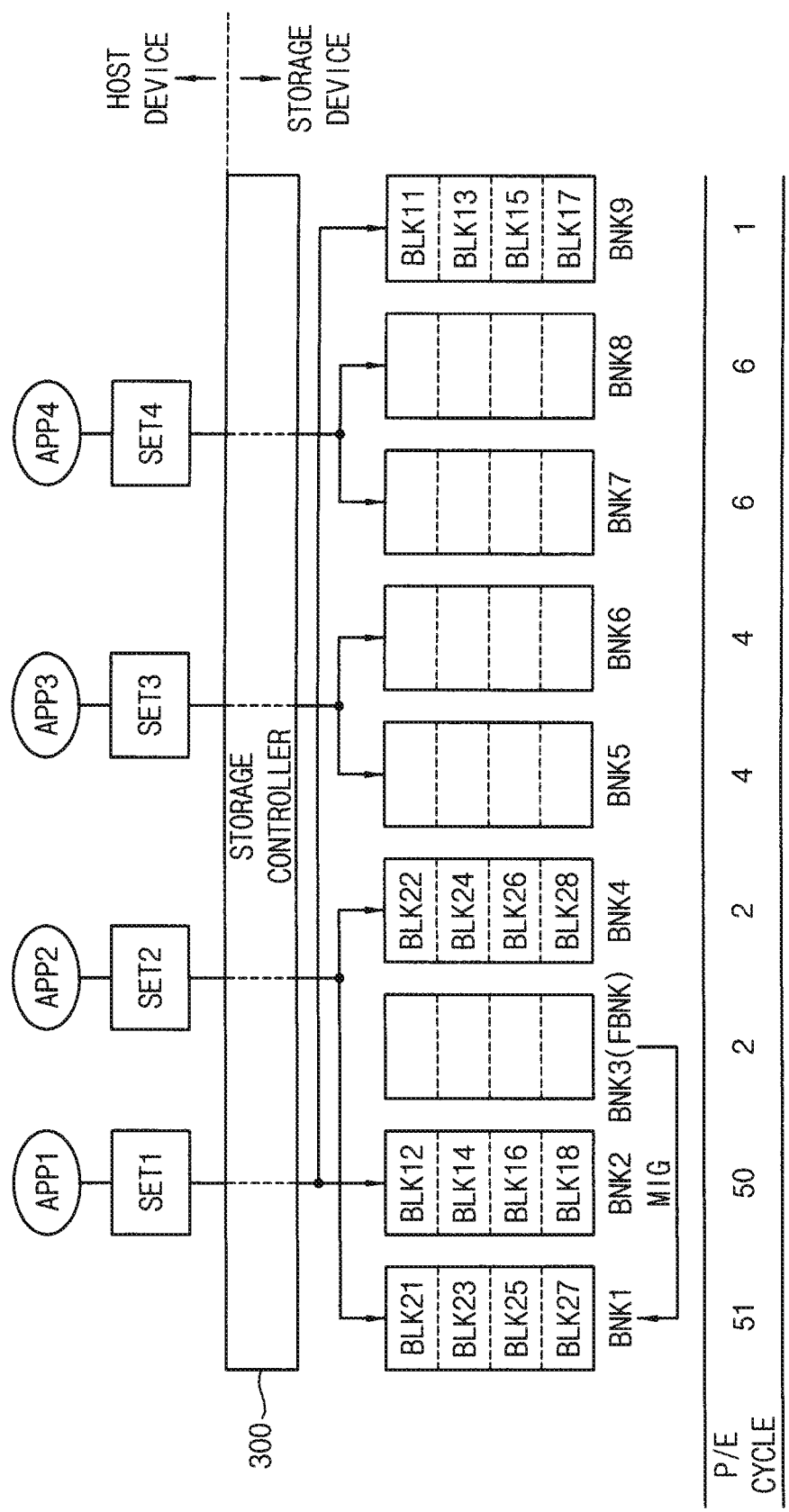
FIG. 16 illustrates that the data migration operation is performed from the third bank to the free bank in the storage system of FIG. 14

FIG. 16 illustrates that the data migration operation is performed from the third bank to the free bank in the storage system of FIG. 14 and FIG. 17 illustrates an example of the mapping table in FIG. 3 in case of FIG. 16.

Referring to FIGS. 16 and 17, the migration manager 360 migrates MIG a second data stored in the third bank BNK3 to the first bank BNK1, which is the free bank FBNK, maps the physical bank address of the first bank BNK1 to the first logical bank address LBK1 of the second set SET2 when the migration of the second data is completed, performs erase operation om the memory blocks BLK21, BLK23, BLK25 and BLK27 of the third bank BNK3, and updates the mapping table 325 by recording the third bank BNK3 as the free bank FBNK in the mapping table 325 as illustrated in FIG. 17.

In case of FIGS. 16 and 17, a program/erase cycle of the first bank BNK1 mapped to the first logical bank address LBK1 of the second set SET2 may have a value of 51. In addition, since the program/erase operation is performed only in the free bank FBNK, there is no interference of performance among the sets.

Figure 18:
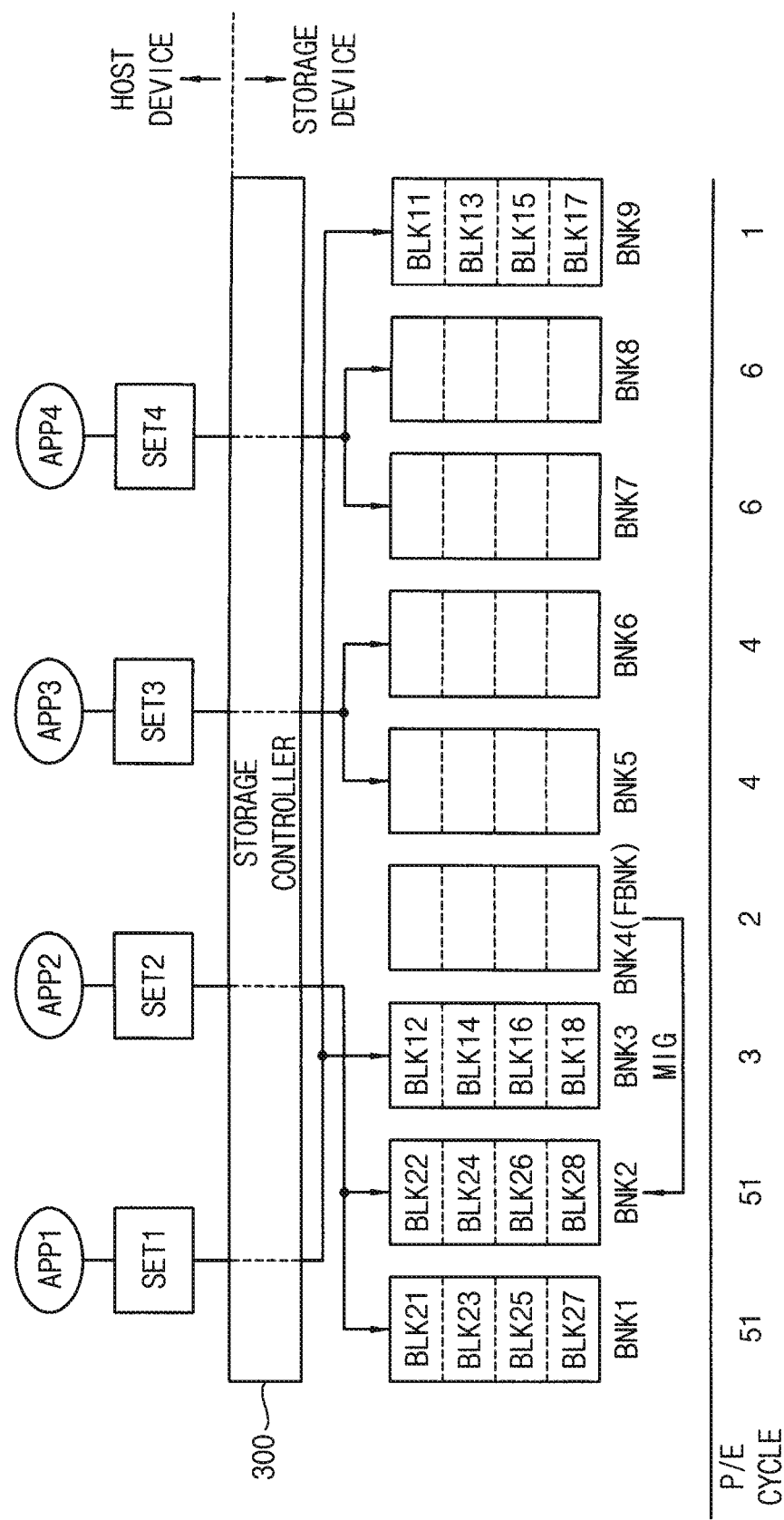
FIG. 18 illustrates that the data migration operation is performed from the fourth bank to the free bank in the storage system of FIG. 16

FIG. 18 illustrates that the data migration operation is performed from the fourth bank to the free bank in the storage system of FIG. 16 and FIG. 19 illustrates an example of the mapping table in FIG. 3 in case of FIG. 18.

In FIG. 18, it is assumed that a third data stored in the second bank BNK2 is already migrated to the third bank BNK3.

Referring to FIGS. 18 and 19, the migration manager 360 migrates MIG a fourth data stored in the fourth bank BNK4 to the second bank BNK2, which is the free bank FBNK, maps the physical bank address of the second bank BNK2 to the second logical bank address LBK2 of the second set SET2 when the migration of the fourth data is completed, performs erase operation om the memory blocks BLK22, BLK24, BLK26 and BLK28 of the fourth bank BNK4, and updates the mapping table 325 by recording the fourth bank BNK4 as the free bank FBNK in the mapping table 325 as illustrated in FIG. 19.

In case of FIGS. 18 and 19, a program/erase cycle of the second bank BNK2 mapped to the second logical bank address LBK2 of the second set SET2 may have a value of 51. In addition, since the program/erase operation is performed only in the free bank FBNK, there is no interference of performance among the sets.

As described with reference to FIGS. 12 through 19, when there occurs imbalance among the program/erase cycles of the sets, the migration manager 360 in the storage controller 300 may performing a wear-leveling by performing the data migration operation to transfer the data among the sets internally in the storage device 200. The data migration operation may be hidden from the host device 100.

When the storage controller 300 receives a read request to the first data from the host device 100 during the first data being migrated from the first bank BNK1 to the ninth bank BNK9 (which c the free bank FBNK), the storage controller 300 may simultaneously provide the first bank BNK1 and the ninth bank BNK9 with a read command corresponding to the read request.

The storage controller 300 may provide the host device 100 with the first data which is received earlier from one of the first bank BNK1 and the ninth bank BNK9, in response to the read command. The storage controller 300 may ignore the first data which is received later from one of the first bank BNK1 and the ninth bank BNK9, in response to the read command instead of providing the first data to the host device 100.

The storage controller 300 may execute a read command on the first bank BNK1 (e.g., a source bank) and a program/ erase command on the ninth bank BNK9 (e.g., a destination bank) mutually exclusively for performing the data migration operation. For executing the commands mutually exclusively, the CPU 310 in FIG. 3 may include a scheduler that schedules commands on the source bank and the destination bank mutually exclusively.

For performing the data migration operation, the storage controller 300 may apply the read command to the first bank BNK1 (e.g., the source bank) and may apply the program/ erase command to the ninth bank BNK9 (e.g., the destination bank).

The storage controller 300 may perform the data migration operation by dynamically assigning physical bank addresses of the banks to logical bank addresses of the sets by using one free bank.

Figure 20:
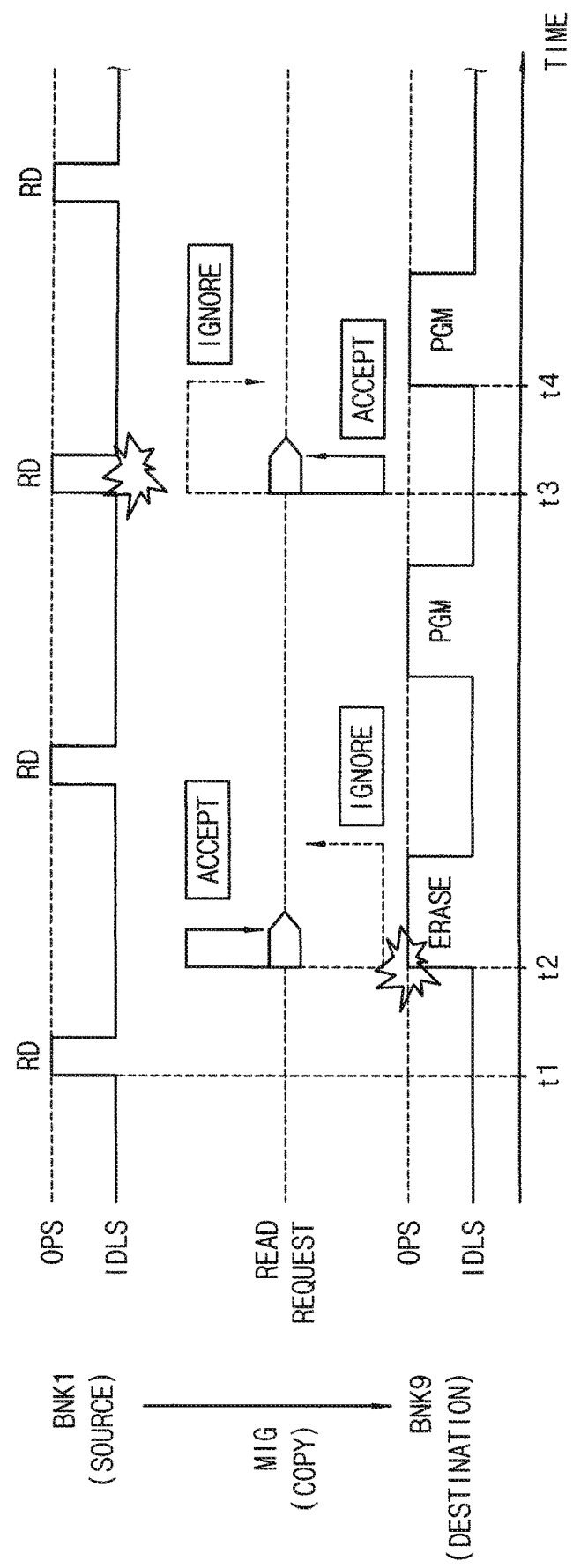
FIG. 20 is a timing diagram for explaining operation of the storage device according to some example embodiments.

FIG. 20 is a timing diagram for explaining operation of the storage device according to some example embodiments.

In FIG. 20, it is assumed that the hose device 100 issues a read request during the first data being migrated from the first bank BNK1 to the ninth bank BNK9 (i.e., the free bank FBNK).

Referring to FIG. 20, the storage controller 300 may execute a read command RD on the first bank BNK1 and a program/erase command on the ninth bank BNK9 mutually exclusively during the first data being migrated from the first bank BNK1 to the ninth bank BNK9 (e.g., the free bank FBNK).

That is, when the storage controller 300 applies a read command RD to the first bank BNK1 at a first time point t1, applies an erase command ERASE to the ninth bank BNK9 mutually exclusively from the read command RD applied to the first bank BNK1 at a second time point t2 and receives a read request at the time point t2, the first bank BNK1 is in an idle state IDLS and the ninth bank BNK9 is in an operating state OPS. Therefore, the ninth bank BNK9 ignores the read request, and the first bank BNK1 accepts the read request to provide a corresponding data to the storage controller 300.

In addition, when the storage controller 300 applies the read command RD to the first bank BNK1 at a third time point t3, applies a program command PGM to the ninth bank BNK9 at a fourth time point t4 mutually exclusively and receives a read request at the third time point t3, the first bank BNK1 is in the operating state OPS and the ninth bank BNK9 is in the idle state IDLS. Therefore, the first bank BNK1 ignores the read request and the ninth bank BNK9 accepts the read request to provide a corresponding data to the storage controller 300.

Figure 21:
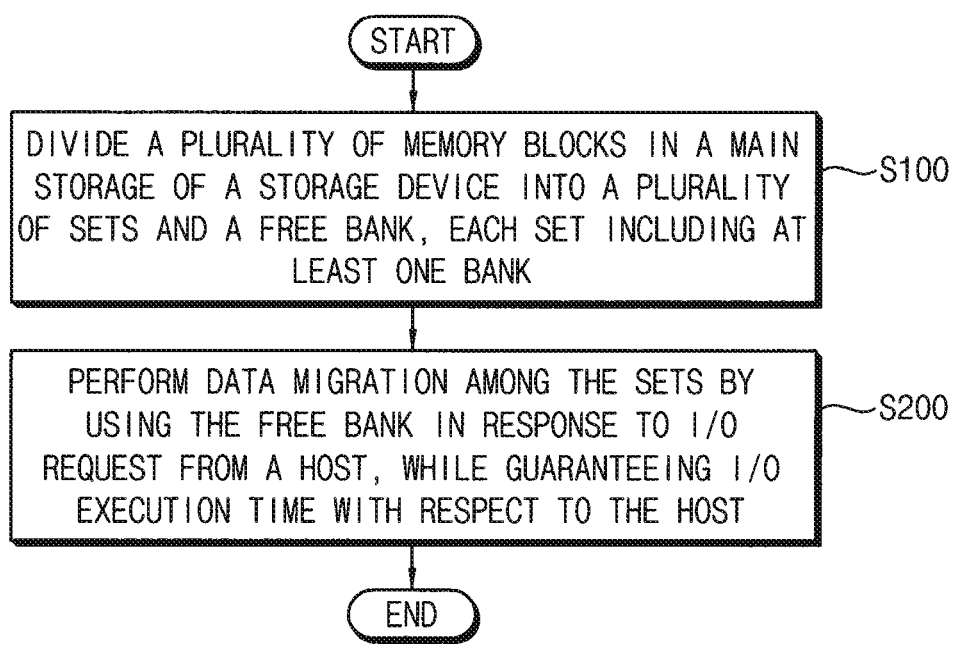
FIG. 21 is a flow chart illustrating a method of operating a storage device according to some example embodiments.

FIG. 21 is a flow chart illustrating a method of operating a storage device according to some example embodiments.

Referring to FIGS. 1 through 21, in a method of operating a storage device 200 including a main storage 400 that stores data and a storage controller 300 that controls the main storage 400, the storage controller 300 divides a plurality of memory blocks of the main storage 400 into a plurality of sets and one free bank (S100) and each of the sets includes at least one bank.

The storage controller 300 performs data migration operation to transfer the data among the sets by using the one free bank in response to an input/output (I/O) request from a host device 100 while guaranteeing a predetermined (deterministic) I/O execution time with respect to the host device 100 (S200).

The data migration operation may be hidden from the host device 100.

The storage controller 300 may perform wear-leveling on sets having different program/erase cycles internally in the storage device 200 by performing the data migration operation.

Figure 22:
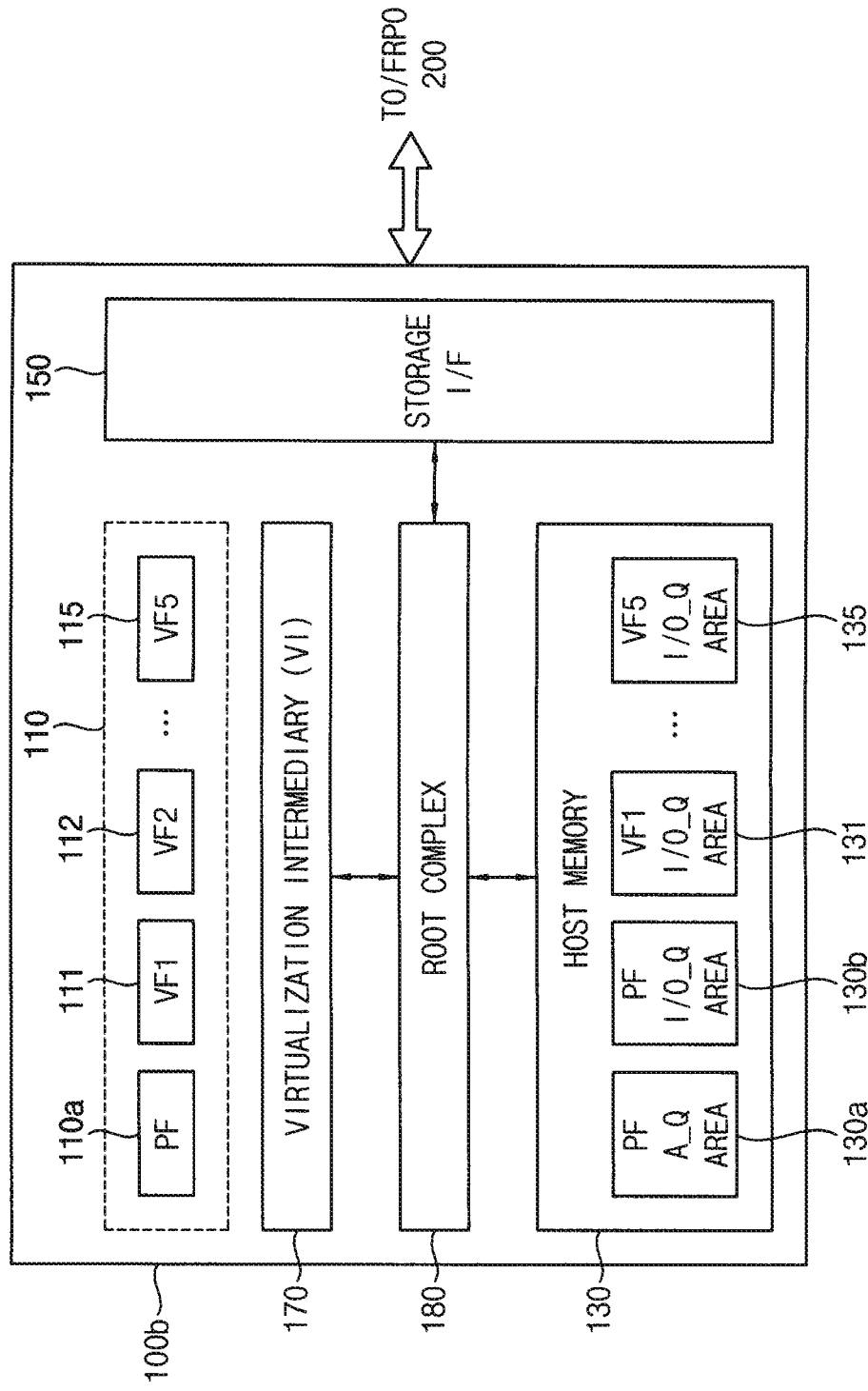
FIG. 22 is a block diagram illustrating another example of the host device in the storage system of FIG. 1 according to some example embodiments.

FIG. 22 is a block diagram illustrating another example of the host device in the storage system of FIG. 1 according to some example embodiments.

The host device 200b of FIG. 22 may support a virtual function. For example, when the host device 200b is included in the storage system 10 of FIG. 1, the storage system 10 may support a virtual function of a single-root IO virtualization (SR-IOV) while supporting an interface scheme according to the NVMe protocol.

Referring to FIG. 22, the host device 100b includes a processor (i.e., a host core) 110, a virtualization intermediary (VI) 170, a root complex (RC) 180, a host memory 130 and a storage interface 150.

The processor 110 may include a physical function (PF) 110a and a plurality of virtual functions (VFs) 111~115. The physical function 110a may be a core or a processor as physical hardware. Each of the VFs 111~115 may be a virtualization core or a processor generated by a virtualization operation of the SR-IOV. Each of the VFs 111~115 may drive an operating system (OS) or an application independently. An OS being driven by a virtual function may be called, for example, a guest OS.

The virtualization intermediary 170 may be connected to the processor 110 and the root complex 180 and performs a function of executing the VFs 111~115 or managing the VFs 111~115. For example, the virtualization intermediary 170 may perform a function of transmitting and managing address information for a virtualization operation of the SR-IOV.

The root complex 180 may represent a root of a hierarchy. The root complex 180 is connected to the virtualization intermediary 170, the host memory 130 and the storage interface 150. The root complex 180 may perform a function of connecting the processor 110 to the host memory 130 or connecting the processor 110 and the host memory 130 to the storage interface 150.

The host memory 130 may be connected to the virtualization intermediary 170, the processor 110, and the storage interface 150 through the root complex 170. The host memory 130 may be used as a working memory for the physical function 110a or each of the VFs 111~115 in the processor 110. For example, an application program, a file system and a device driver may be loaded into the host memory 130.

The storage interface 150 is connected to the root complex 180 and provides a communication between the host device 100a and the storage device 200. For example, the storage interface 150 may provide queue based commands and data to the storage device 200 or receive information of commands and data processed by the storage device 200 according to the NVMe protocol scheme.

For example, as illustrated in FIG. 22, to support a SR-IOV virtual function in the NVMe protocol interface scheme, the host memory 130 may provide a PF administrator queue storage area PF A_Q Area 130a for storing an administrator queue (AQ) of the physical function 110a, a PF input/output queue storage area PF I/O_Q Area 130b for storing an input/output queue of the physical function 110a, and a plurality of VF input/output queue storage areas VF1 I/O_Q Area~VF5 I/O_Q Area 131~135 for storing input/output queues of the virtualization functions. For example, the queue commands may be stored in each storage area using a circular queue scheme mainly used in the NVMe protocol interface scheme.

Figure 23:
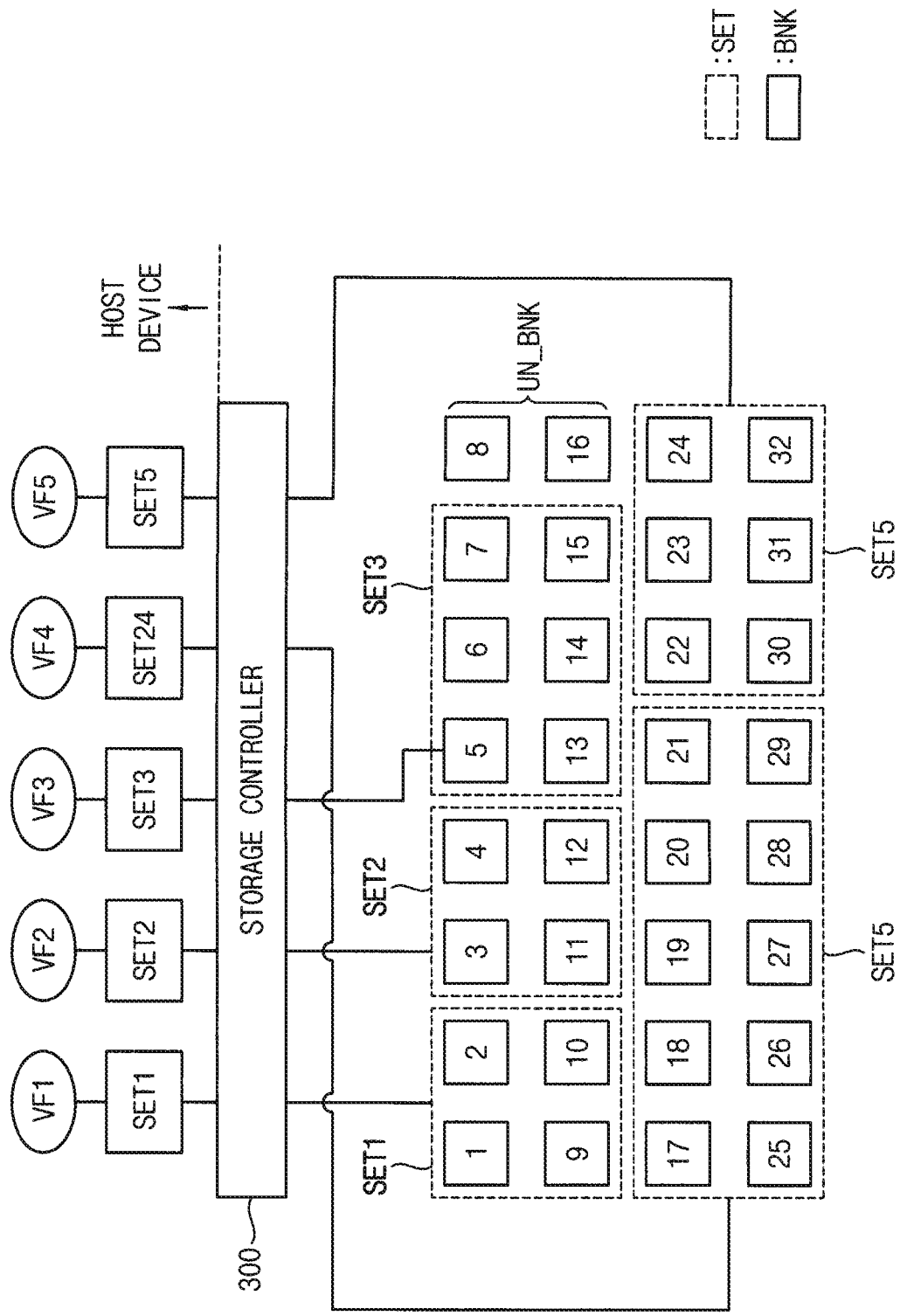
FIG. 23 illustrates an example of the storage system when the host device is employed in the storage system of FIG. 1.

FIG. 23 illustrates an example of the storage system when the host device is employed in the storage system of FIG. 1.

Referring to FIGS. 1 and 23, the host device 100 or 100b controls the storage device 200 by unit of set and the host device 100 or 100b assign VFs 111~115 in the processor 110 to a plurality of sets SET1~SET5 including at least one bank that discriminates a plurality of memory blocks in the main storage 400.

In FIG. 23, banks denoted by 8 and 16, which are not assigned to the sets SET1~SET5, are unused banks UN_BNK and may be used as the free bank FBNK.

Figure 24:
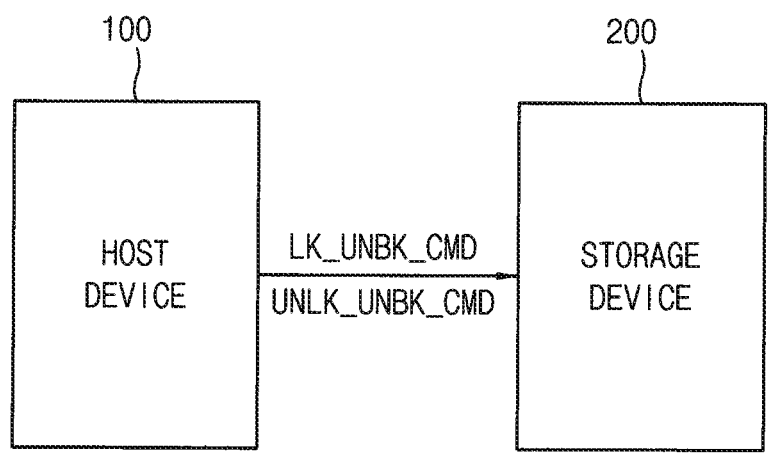
FIGS. 24 and 25 illustrate interfaces between the host device and the storage device in the storage system, for securing a free bank, according to some example embodiments.
Figure 25:
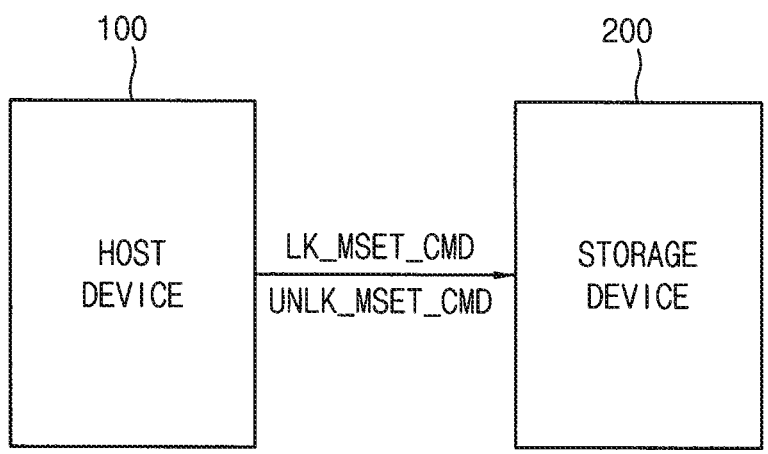

FIGS. 24 and 25 illustrate interfaces between the host device and the storage device in the storage system, for securing a free bank, according to some example embodiments.

Referring to FIG. 24, when the banks denoted by 8 and 16, are unused banks UN_BNK which are not assigned to the sets SET1~SET5 as illustrated in FIG. 23, for securing the free bank, the host device 100b may provide the storage controller 300 with an unused bank lock command LK_UNBK_CMD to assign the banks denoted by 8 and 16, which are not assigned to the virtual functions VFs 111~115, to the free bank. That is, the storage controller 300 may reserve the banks denoted by 8 and 16 instead of opening the banks denoted by 8 and 16 to users by applying the unused bank lock command LK_UNBK_CMD.

The storage controller 300 may perform the data migration operation by use one of the used banks denoted by 8 and 16 as a free bank.

If the storage device 200 does not include an unused bank, the storage controller 300 may return error message to the host device 100 in response to the unused bank lock command LK_UNBK_CMD. If the storage device 200 includes an unused bank, the storage controller 300 may abort set assignment and user I/O request to the unused bank.

For releasing the assigned free bank, the host device 100b may provide the storage controller 300 with an unused bank unlock command UNLK_UNBK_CMD. In this case, when the data migration is in progress, the storage controller 300 may abort the unused bank unlock command UNLK_UNBK_CMD.

Referring to FIG. 25, when the banks denoted by 3, 4, 11 and 12 assigned to the virtual function VF2, the virtual function VF2 is activated and then deactivated as in FIG. 23, for securing the free bank, the host device 100b may provide the storage controller 300 with an unused set lock command LK_MSET_CMD.

In this case, storage controller 300 may perform the data migration operation by use one of the banks denoted by 3, 4, 11 and 12 that are not assigned to a set, in response to the unused set lock command LK_MSET_CMD. When an I/O request on the banks denoted by 3, 4, 11 and 12 is received from a user, the storage controller 300 may abort the I/O request.

For releasing the assigned free bank assigned to the deactivated virtual function, the host device 100b may provide the storage controller 300 with an unused set unlock command UNLK_MSET_CMD. When an I/O request on the banks released from the free bank is received from a user, the storage controller 300 may accept the I/O request.

Figure 26:
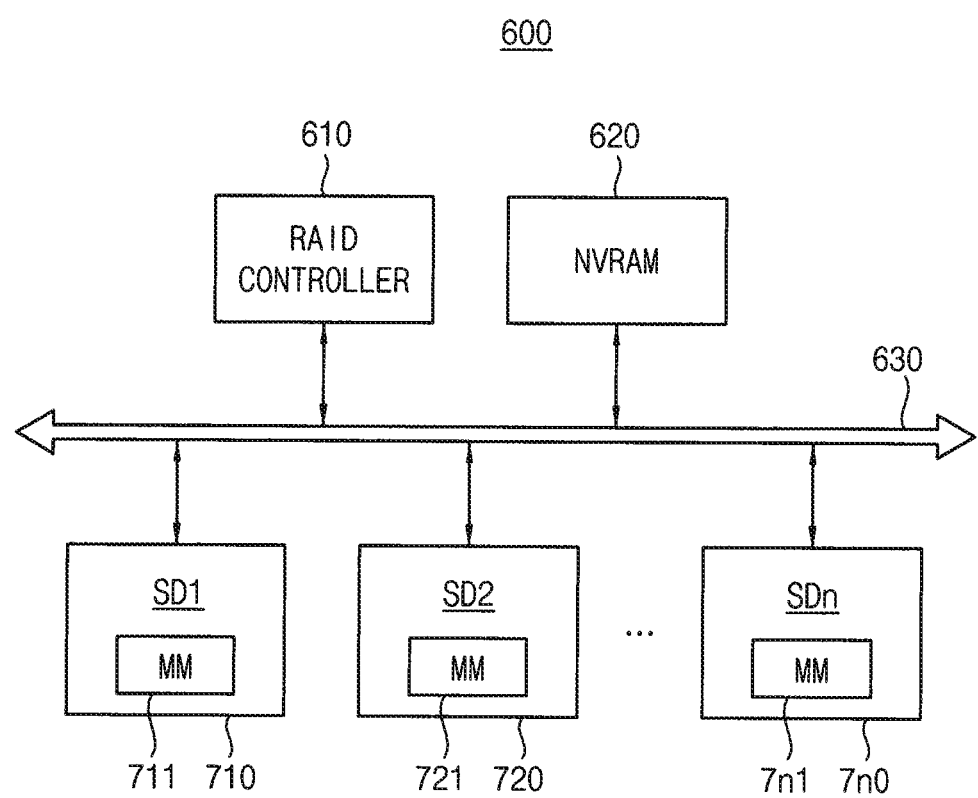
FIG. 26 is a block diagram illustrating a redundant array of independent disks (RAID) storage system, according to some example embodiments.

FIG. 26 is a block diagram illustrating a redundant array of independent disks (RAID) storage system, according to some example embodiments.

Referring to FIG. 26, a RAID storage system 600 may include a RAID controller 610, a nonvolatile random access memory (NVRAM) 620, a plurality of storage devices SD1 710 through SDn 7n0, and a bus 630. Components of the RAID storage system 600 may be connected to each other to communicate with each other through the bus 630.

A RAID method may include, to prevent data loss when some storage devices are broken, a method of restoring data by using a mirroring-based technique, and a method of restoring data by using a parity-based technique. For example, a parity-based RAID method may be applied to the RAID storage system 600.

The storage devices 710 through 7n0 may store various kinds of data, and may be implemented by a solid state drive, an embedded multimedia card (eMMC), or a universal flash storage (UFS).

In some example embodiments, the storage devices 710 through 7n0 may be implemented by solid state drives. The solid state drives may implement the storage devices 710 through 7n0 by using a plurality of nonvolatile memory chips. In some example embodiments, solid state drives may implement storage devices by using a plurality of flash memory chips.

Each of the storage devices 710 through 7n0 may include corresponding one of migration managers 711 through 7n1. Each of the migration managers 711 through 7n1 may perform data migration operation internally in corresponding storage device.

Each of the storage devices 710 through 7n0 may employ the storage device 200 in FIG. 1 and may perform wear-leveling internally by performing the data migration operation to transfer data among set using one free bank.

The NVRAM 620 may be or include RAM in which stored data remains even after power is turned off. In some example embodiments, the NVRAM 620 may be implemented by phase change RAM (PRAM), ferroelectric RAM (FRAM), or magnetic RAM (MRAM). In some example embodiments, the NVRAM 620 may also realize power applied to dynamic random access memory (DRAM) or static RAM (SRAM) that are volatile memories, by using a battery or a capacitor. For example, when system power is turned off, DRAM or SRAM is operated by a battery or a capacitor and data stored in the DRAM or SRAM is shifted to a storage device that is a nonvolatile storage space, and thus, data may be maintained. Therefore, data stored in DRAM or SRAM may be maintained even if system power is turned off.

A cache area, in which data to be written in the plurality of storage devices 710 through 7n0 for each stripe unit is stored, may be allocated in the NVRAM 620. The cache area allocated in the NVRAM 620 to store the data to be written in the plurality of storage devices 710 through 7n0 for each stripe unit may be referred to as a stripe-cache area.

The NVRAM 620 may store mapping table information used in the RAID storage system 600. The mapping table information may include address mapping table information converting a logical address into a physical address and/or stripe mapping table information indicating stripe grouping information. The stripe grouping information may include memory blocks forming stripes, respectively. The stripe mapping table information may also include valid page ratio information corresponding to each stripe.

The RAID controller 610 may control the plurality of storage devices 710 through 7n0 based on a RAID environment. In some example embodiments, the RAID environment may be a log-structured RAID environment. In the log-structured RAID environment, the RAID controller 610, when updating data written in the storage devices 710 through 7n0, may control the RAID storage system 600 to write data in a new location in a log form without overwriting data.

The RAID controller 610 may perform an operation of registering pieces of memory block position information of the storage devices 710 through 7n0 forming a stripe in a stripe mapping table.

The RAID controller 610 may perform an address conversion process and/or a stripe grouping process by using mapping table information stored in the NVRAM 620. For example, the RAID controller 610 may convert a logical address into a physical address by using address mapping table information. The RAID controller 610 may perform garbage collection for each stripe unit by using stripe mapping table information.

The RAID controller 610 may perform an operation of selecting a victim stripe for garbage collection by using mapping table information. For example, the RAID controller 610 may find a stripe with the lowest valid page ratio from among grouped stripes by using stripe mapping table information, and may select the stripe as a victim stripe.

The present disclosure may be applied to various electronic devices including a storage device. For example, the present disclosure may be applied to systems such as be a mobile phone, a smart phone, a personal digital assistant (PDA), a portable multimedia player (PMP), a digital camera, a camcorder, personal computer (PC), a server computer, a workstation, a laptop computer, a digital TV, a set-top box, a portable game console, a navigation system, etc.

The foregoing is illustrative of example embodiments and is not to be construed as limiting thereof. Although a few example embodiments have been described, those of ordinary skill in the art will readily appreciate that many modifications are possible in the example embodiments without materially departing from the novel teachings and advantages of the present disclosure. Accordingly, all such modifications are intended to be included within the scope of the present disclosure as defined in the claims.

What is claimed is:

1. A storage device comprising:
a main storage including a plurality of nonvolatile memory devices, the main storage device configured to store data; and
a storage controller configured to control the main storage,
wherein the storage controller is configured to,
divide a plurality of memory blocks of the plurality of nonvolatile memory devices into a plurality of banks,
assign each one of the plurality of banks into one of a) a plurality of sets and b) one free bank, each of the plurality of sets including at least one bank,
perform data migration operation to transfer the data among the sets by using the one free bank in response to an input/output (I/O) request from an external host device, the data migration operation performed by transferring the data among the sets using the one free bank within a deterministic I/O execution time associated with the I/O request, and
control the data migration operation such that the I/O request is independent of the data migration operation,
wherein the storage controller is configured to perform interfacing with the host device through a nonvolatile memory express (NVMe) protocol, and the deterministic I/O execution time during which the transferring the data among the sets using the one free bank is defined by the NVMe protocol.

2. The storage device of claim 1, wherein the storage controller is configured to perform only one selected from the group consisting of a read operation, a program operation, and an erase operation, on one bank of the plurality of banks at a specific time.

3. The storage device of claim 2, wherein the storage controller includes:
a mapping table configured to receive, from the host device, a set identifier and a logical bank address for accessing one bank of the plurality of banks, the mapping table configured to store mapping information between the logical bank address and a physical bank address corresponding to the logical bank address; and
a migration manager configured to manage the mapping table, configured to perform the data migration operation based on a number of program/erase cycles of each of the sets, and configured to update the mapping table in response to the data migration operation being completed.

4. The storage device of claim 3, wherein the migration manage is configured to count program/erase cycles of each of the banks in response to a request from the host device, and is configured to count program/erase cycles of each of the banks in response to the data migration operation.

5. The storage device of claim 3, wherein the plurality of sets at least include a first set and a second set, the first set includes a) a first bank of the plurality of banks and b) a second bank of the plurality of banks, and the second set includes c) a third bank of the plurality of banks and d) a fourth bank of the plurality of banks,
wherein a program/erase cycle of the first set corresponds to a first cycle and the a program/erase cycle of the second set corresponds to a second cycle, and
wherein when the first cycle is greater than the second cycle, the migration manager is configured to,
migrate a first data stored in the first bank to the free bank,
map a physical bank address of the free bank to a first logical bank address of the first set in response to the migration of the first data being completed,
perform erase operation on memory blocks of the first bank, and
record the first bank in the mapping table as the free bank.

6. The storage device of claim 5, wherein the migration manager is configured to:
migrate a second data stored in the third bank to the first bank;
map a physical bank address of the first bank to a first logical bank address of the second set in response to the migration of the second data being completed;
perform erase operation on memory blocks of the third bank; and
record the third bank in the mapping table as the free bank.

7. The storage device of claim 6, wherein the migration manager is configured to perform a wear leveling between the first set and the second set by sequentially performing the migration and updating the logical bank address on the second bank and the fourth bank.

8. The storage device of claim 5, wherein in response to the storage controller receiving a read request on the first data from the host device during the migration of the first data,
the storage controller is configured to simultaneously provide the first bank and the free bank with a read command, the read command corresponding to the read request.

9. The storage device of claim 8, wherein, in response to the read command, the storage controller is configured to provide the host device with the first data received earlier from one of the first bank and the free bank.

10. The storage device of claim 8, wherein, in response to the read command, the storage controller is configured to ignore the first data received later from one of the first bank and the free bank.

11. The storage device of claim 5, wherein the storage controller is configured to execute a read command on the first bank mutually exclusively from a program/erase command on the free bank.

12. The storage device of claim 5, wherein the storage controller is configured to perform the migration of the first data by a) applying a read command to the first bank and b) applying a program/erase command to the free bank.

13. The storage device of claim 1, wherein the storage controller is configured to perform the data migration operation by dynamically assigning physical bank addresses of the banks to logical bank addresses of the sets.

14. The storage device of claim 1, wherein at least one of the plurality of memory blocks includes NAND strings stacked on a substrate.

15. A storage system comprising:
a storage device including a main storage configured to store data and a storage controller configured to control the main storage, the main storage including a plurality of nonvolatile memory devices; and
a host device configured to control the storage device by units of a set,
wherein the storage controller is configured to, divide a plurality of memory blocks of the plurality of nonvolatile memory devices into a plurality of banks, assign each of the plurality of banks into one of a) a plurality of sets and b) one free bank, each of the plurality of sets including at least one bank, perform data migration operation to transfer the data among the sets by using the one free bank in response to an input/output (I/O) request from an external host device by transferring the data among the sets using the one free bank within a deterministic I/O execution time associated with the I/O request, and control the data migration operation such that the I/O request is independent of the data migration operation, wherein the storage device is configured to perform interfacing with the host device through a nonvolatile memory express (NVMe) protocol, and the deterministic I/O execution time during which the transferring the data among the sets using the one free bank occurs is defined by the NVMe protocol.

16. The storage system of claim 15, wherein the host device includes:

a processor including a) at least one physical function and b) a plurality of virtual functions; and a host memory configured to operate as a working memory for the processor, wherein the host device is configured to provide the storage controller with an unused bank lock command to assign at least one unused bank to the free bank, the unused bank not assigned to the virtual functions of the banks, and the host device is configured to provide the storage controller with an unused bank unlock command to release the assigned free bank.

17. The storage system of claim 15, wherein the host device includes:

a processor including a) at least one physical function and b) a plurality of virtual functions; and a host memory configured to operate as a working memory for the processor, wherein the host device is configured to provide the storage controller with an unused set lock command to assign at least one unused bank to the free bank, the unused bank being assigned to the virtual functions, the unused bank corresponding to a deactivated virtual function of the banks, and the host device is configured to provide the storage controller with an unused set unlock command to release the assigned free bank.

18. A method of operating a storage device including a main storage configured to store data and a storage controller configured to control the main storage, the method comprising:

dividing a plurality of memory blocks of the main storage into a plurality of sets and one free bank, each of the plurality of sets including at least one bank; and in response to an input/output (I/O) request from an external host device, performing a data migration operation to transfer the data among the plurality of sets by using the one free bank, the data migration performed by transferring the data among the sets using the one free bank within a deterministic I/O execution time associated with the I/O request, wherein the storage device is configured to perform interfacing with the host device through a nonvolatile memory express (NVMe) protocol, and the deterministic I/O execution time during which the transferring the data among the sets occurs is defined by the NVMe protocol.

* * * * *